US012565089B2

(12) United States Patent
Wight

(10) Patent No.: US 12,565,089 B2
(45) Date of Patent: *Mar. 3, 2026

(54) TRUCK CAP AND CLOSED-CAVITY BAG MOLDING PROCESS FOR A TRUCK CAP

(71) Applicant: LTA II MANUFACTURING LLC, Ottawa, KS (US)

(72) Inventor: Joshua W. Wight, Richmond, KS (US)

(73) Assignee: LTA II MANUFACTURING LLC, Ottawa, KS (US)

( * ) Notice: Subject to any disclaimer, the term of this patent is extended or adjusted under 35 U.S.C. 154(b) by 352 days.

This patent is subject to a terminal disclaimer.

(21) Appl. No.: 18/244,952

(22) Filed: Sep. 12, 2023

(65) Prior Publication Data

US 2024/0308311 A1     Sep. 19, 2024

Related U.S. Application Data

(63) Continuation-in-part of application No. 18/121,270, filed on Mar. 14, 2023.

(51) Int. Cl.
B60J 7/00     (2006.01)
B29C 70/44     (2006.01)
B60J 7/16     (2006.01)
B29L 31/30     (2006.01)

(52) U.S. Cl.
CPC ........... B60J 7/1607 (2013.01); B29C 70/443 (2013.01); *B29L 2031/30* (2013.01)

(58) Field of Classification Search
CPC ......... B29C 70/443; B32B 5/18; B32B 5/245; B32B 7/02; B32B 27/12; B32B 27/38; B32B 37/1018; B32B 37/12; B32B 38/08; B32B 2260/023; B32B 2262/101; B32B 2233/025; B32B 2305/07; B32B 2307/718; B32B 2307/732; B32B 2309/68; B32B 2315/085; B32B 2323/04; B32B 2363/00; B32B 2506/00; B60J 7/1607; B29K 2063/00; B29K 2309/08; B29L 2031/30

USPC ...................................................... 296/100.02
See application file for complete search history.

(56) References Cited

U.S. PATENT DOCUMENTS

| | | |
|---|---|---|
| 4,021,874 A | 5/1977 | Alter et al. |
| 4,201,823 A | 5/1980 | Russell |
| 4,216,047 A | 8/1980 | Hilliard et al. |
| 4,942,013 A | 7/1990 | Palmer et al. |
| 5,005,510 A | 4/1991 | Schad |

(Continued)

OTHER PUBLICATIONS

LTA Manufacturing poster displayed at 2022 SEMA Show, Nov. 1, 2022 (1 pg).

*Primary Examiner* — Steven O Douglas
(74) *Attorney, Agent, or Firm* — Stinson LLP

(57)          ABSTRACT

A truck cap and a closed-cavity bag molding process of making a truck cap. The truck cap includes a composite top and a base support positioned in a sidewall of the top between first and second layers of fiber mats. A composite base is coupled to the base support. A closed-cavity bag molding process of making a truck cap includes placing a first layer of fiber mat into a mold, mounting at least one base support to the first layer adjacent a sidewall of the mold, placing a second layer of fiber mat over the first layer and base support, laying a flexible cover over the second layer, actuating a vacuum to draw air out of the first and second layers, and delivering resin to the layers of fiber mat.

16 Claims, 32 Drawing Sheets

(56)                    References Cited

U.S. PATENT DOCUMENTS

| | | | |
|---|---|---|---|
| 6,228,918 | B1 | 5/2001 | Hardebeck |
| 6,286,879 | B1 | 9/2001 | Haque et al. |
| 6,945,589 | B2 | 9/2005 | Quesenberry |
| 8,470,432 | B2 | 6/2013 | Meyer |
| 10,086,684 | B1 | 10/2018 | Stamm, Jr. |
| 10,384,418 | B2 | 8/2019 | Wang et al. |
| 10,894,466 | B2 | 1/2021 | Kramer |
| 10,940,899 | B2 * | 3/2021 | McKinney ........... B62D 29/043 |
| 11,235,648 | B2 | 2/2022 | Oliver et al. |
| 11,456,506 | B2 | 9/2022 | Song et al. |
| 2020/0130485 | A1 | 4/2020 | Ireland et al. |
| 2022/0203811 | A1 | 6/2022 | Hickey et al. |
| 2022/0266666 | A1 | 8/2022 | Sinchok |
| 2023/0373570 | A1 * | 11/2023 | Facchinello ........... B62D 33/04 |
| 2024/0002651 | A1 * | 1/2024 | Macy ................... C08F 220/40 |

* cited by examiner

32A

32B

32C

32D

28A

34A

30

28B

32D
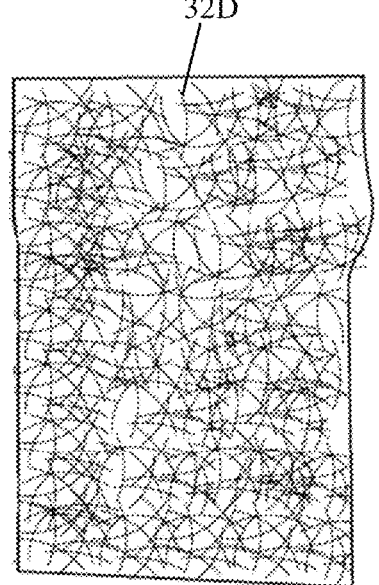
28B
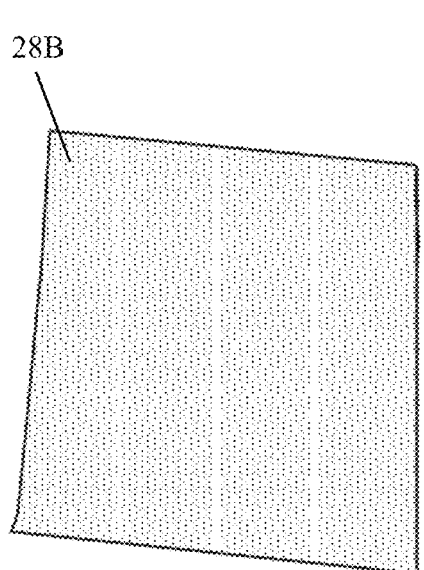
FIG. 20A
FIG. 20B

TRUCK CAP AND CLOSED-CAVITY BAG MOLDING PROCESS FOR A TRUCK CAP

CROSS-REFERENCE TO RELATED APPLICATIONS

This application claims priority to and is a Continuation-in-Part of U.S. patent application Ser. No. 18/121,270, filed on Mar. 14, 2023, which is incorporated herein by reference in its entirety.

FIELD

The present disclosure generally relates to the field of pickup truck accessories, and more particularly to a truck cap and a method of making a truck cap for covering a cargo area of a pickup truck.

BACKGROUND

Truck caps, commonly referred to as camper shells, truck toppers, canopies, or other names, are commonly manufactured by using an open mold process. In general, an open mold process includes spraying a mixture of chopped fiberglass and resin into a mold and rolling the mixture against the surfaces of the mold. The process is relatively time consuming, laborious, and messy. The resulting truck cap may include small pockets of air, which can cause an uneven surface and be prone to allowing water or moisture to seep in. Further, a truck cap made using an open mold process often has a thickness that varies at different locations on the cap, which may cause the truck cap to weigh more than desired. For example, a truck cap formed from an open mold process can weigh about 125-135 pounds. An open mold truck cap also has an inner surface, or "B-side," that is relatively rough due to loose ends of fiberglass jutting out from the surface.

SUMMARY

In one aspect, a truck cap for covering a cargo area of a truck includes a composite base and a composite top coupled to the base. The composite base includes a base fiber mat impregnated with a base resin. The composite base is configured for mounting to sidewalls of a truck. The composite top includes a first layer of fiber mat and a second layer of fiber mat. The first and second layers are impregnated with a top resin. The composite top comprises a sidewall and a roof extending from the sidewall. A base support is positioned in the sidewall between at least a portion of the first and second layers. The truck cap may be made using a closed cavity bag molding process. The truck cap may be lighter, stronger, and have a smoother B-side than a conventional truck cap made from an open molding process.

In another aspect, a closed cavity bag molding process for manufacturing a truck cap includes providing a female mold shaped to form a top of a truck cap. The female mold has a roof portion, and a sidewall extending upward from the roof portion. The process includes placing a first layer of fiber mat in the mold so that the first layer substantially covers the roof portion and the sidewall. A base support is mounted to the first layer adjacent the sidewall. A second layer of fiber mat is placed over the first layer and the base support. A flexible cover is laid over the second layer. The cover has at least one injection port and at least one vacuum port. At least one vacuum is actuated. The vacuum is in fluid connection with the at least one vacuum port so that the vacuum draws air out of the first and second layers. Resin is delivered through the at least one injection port so the resin impregnates the first and second layers as the vacuum draws air through the at least one vacuum port.

The process may further include forming a base of a truck cap using a closed cavity bag molding process. The base including at least one layer of fiber mat impregnated with resin. The process may further include removing the cover from the mold once the resin has at least partially cured to form a top of a truck cap in the female mold. The base is then inserted into the female mold between first and second sides of the molded top so that the base is supported by the base support. The base may be mounted to the base support by bonding and/or with fasteners. A reinforcement may be placed on top of at least a portion of the first layer so that the reinforcement is positioned over at least a portion of the roof portion of the mold.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 20A is an elevation of a "B-side" of the truck cap portion shown in FIG. 19A;

FIG. 20B is an elevation of a "B-side" of the truck cap portion shown in FIG. 19B;

DETAILED DESCRIPTION OF EXEMPLARY EMBODIMENT

Figure 1:
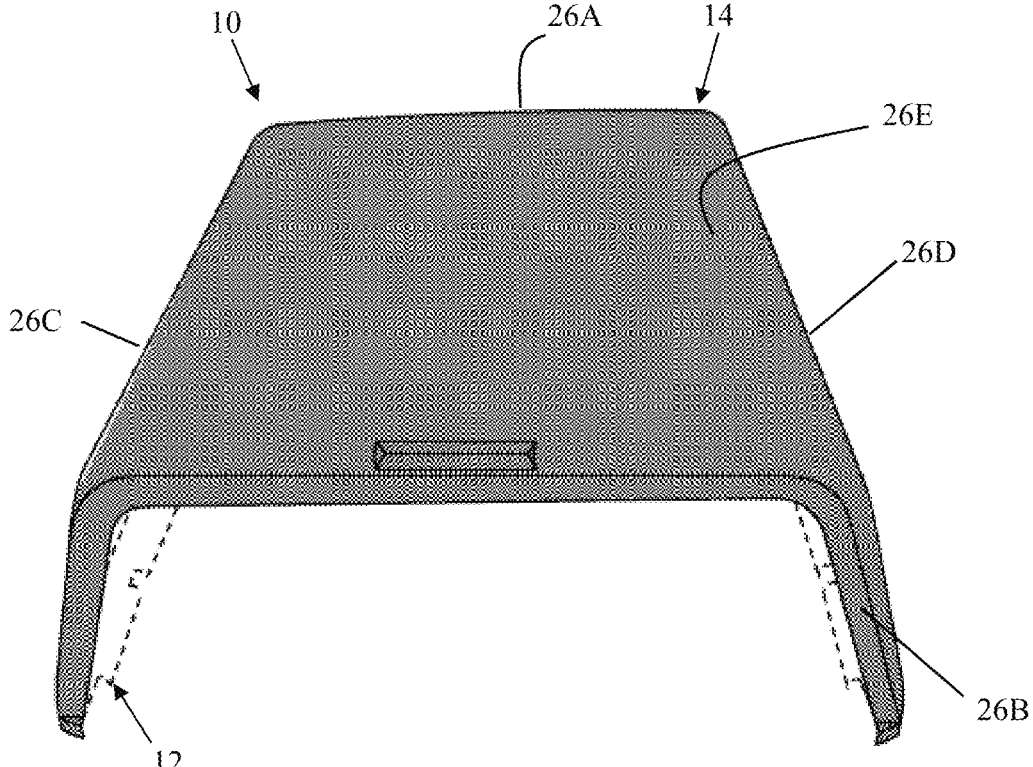
FIG. 1 is a rear perspective of a truck cap in accordance with one exemplary embodiment of the invention described herein.
Figure 2:
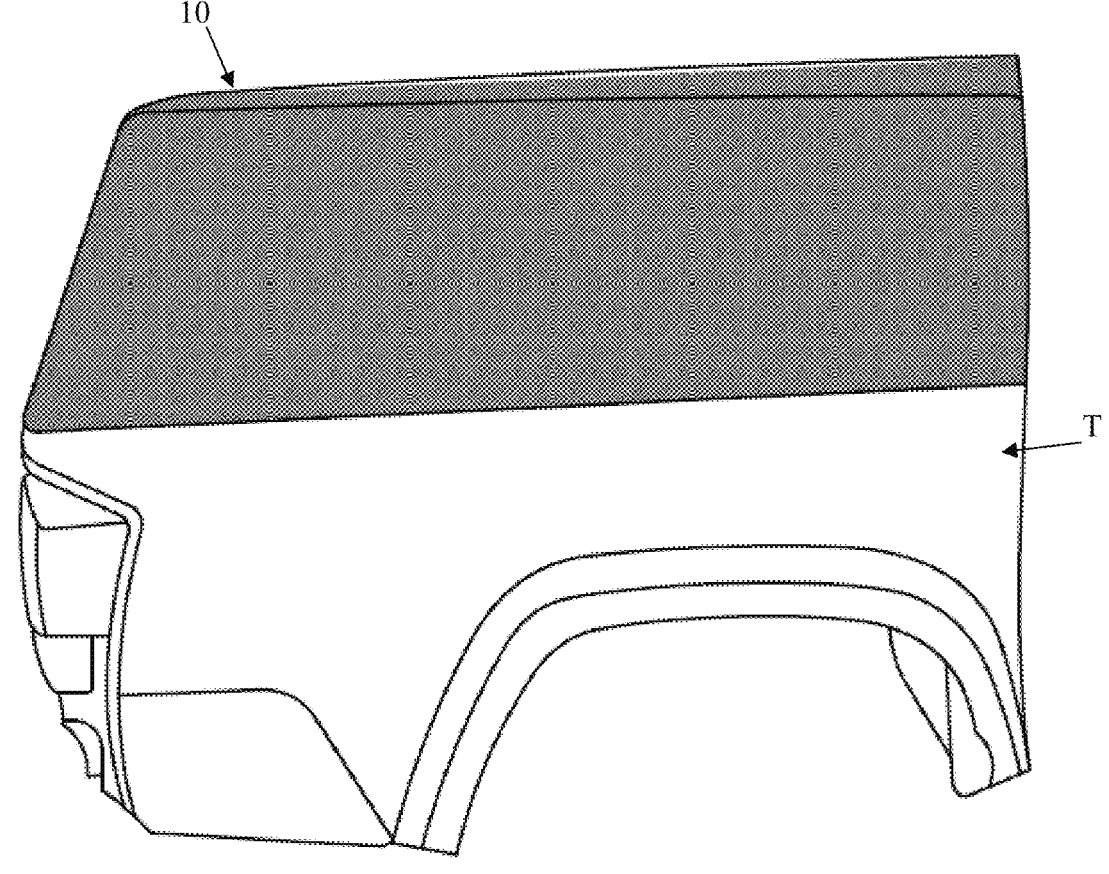
FIG. 2 is a right side elevation of the truck cap mounted on a pickup truck.

Referring to FIGS. 1 and 2, the present disclosure pertains generally to a truck cap 10 and a closed cavity bag molding (CCBM) process for making the truck cap 10. The truck cap may be referred to as a camper shell, truck topper, bed cap, box cap, a shell, canopy, or other names, and is generally a small housing or rigid canopy used for covering a cargo area of a pickup truck. The truck cap 10 may be lighter weight and stronger than a conventional truck cap, making it particularly useful for a variety of purposes. For example, the truck cap 10 may be used in a setting such as overlanding, with relatively heavy items mounted to the truck cap 10 (e.g., a rooftop tent). Further, due to the relatively low weight of the truck cap 10, a single user may be able to install and remove the truck cap by themselves.

As is generally known, the cargo area of a pickup truck is located behind a cab of the truck. For purposes of this disclosure, the cargo area is defined by a bed of the truck, a front wall extending upward from the bed, a left sidewall extending upward from the bed, a right sidewall extending upward from the bed and opposite the left sidewall, and a tail gate opposite the front wall. The tail gate is moveable up and down between closed and open positions, as is generally known. In the open positon, the tail gate lays flat forming an extension of the bed, and in the closed position the tail gate forms a rear wall of the cargo area.

As is generally known, truck beds vary in size. For example, truck beds may have a length between about 60 to 90 inches. As a non-limiting example, the truck cap 10 shown in the drawings and described below may be configured for mounting to a Toyota Tacoma pickup truck, indicated as reference T in FIG. 2. The truck T may have a truck bed that is 60 inches long with bed rails having a width of 3.25 inches. However, the truck cap described herein may be formed with dimensions suitable for mounting to a truck to cover any size of truck cargo area, and the method of making a truck cap described herein may be modified to produce a truck cap with dimensions suitable for mounting to a truck to cover any size of truck cargo area.

Figure 3A:
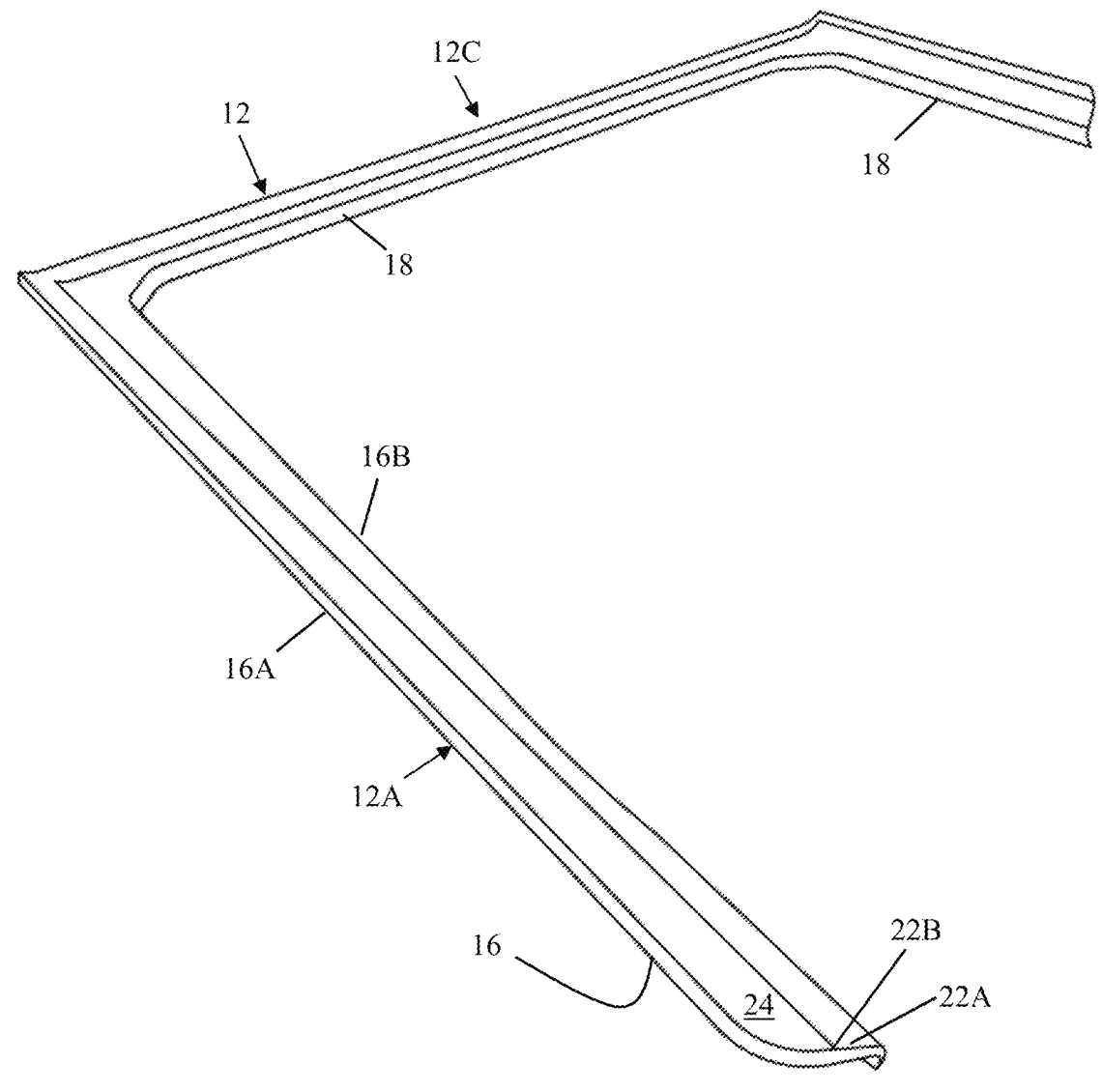
FIG. 3A is a left side perspective of a base of the truck cap shown in FIG. 1.
Figure 3B:
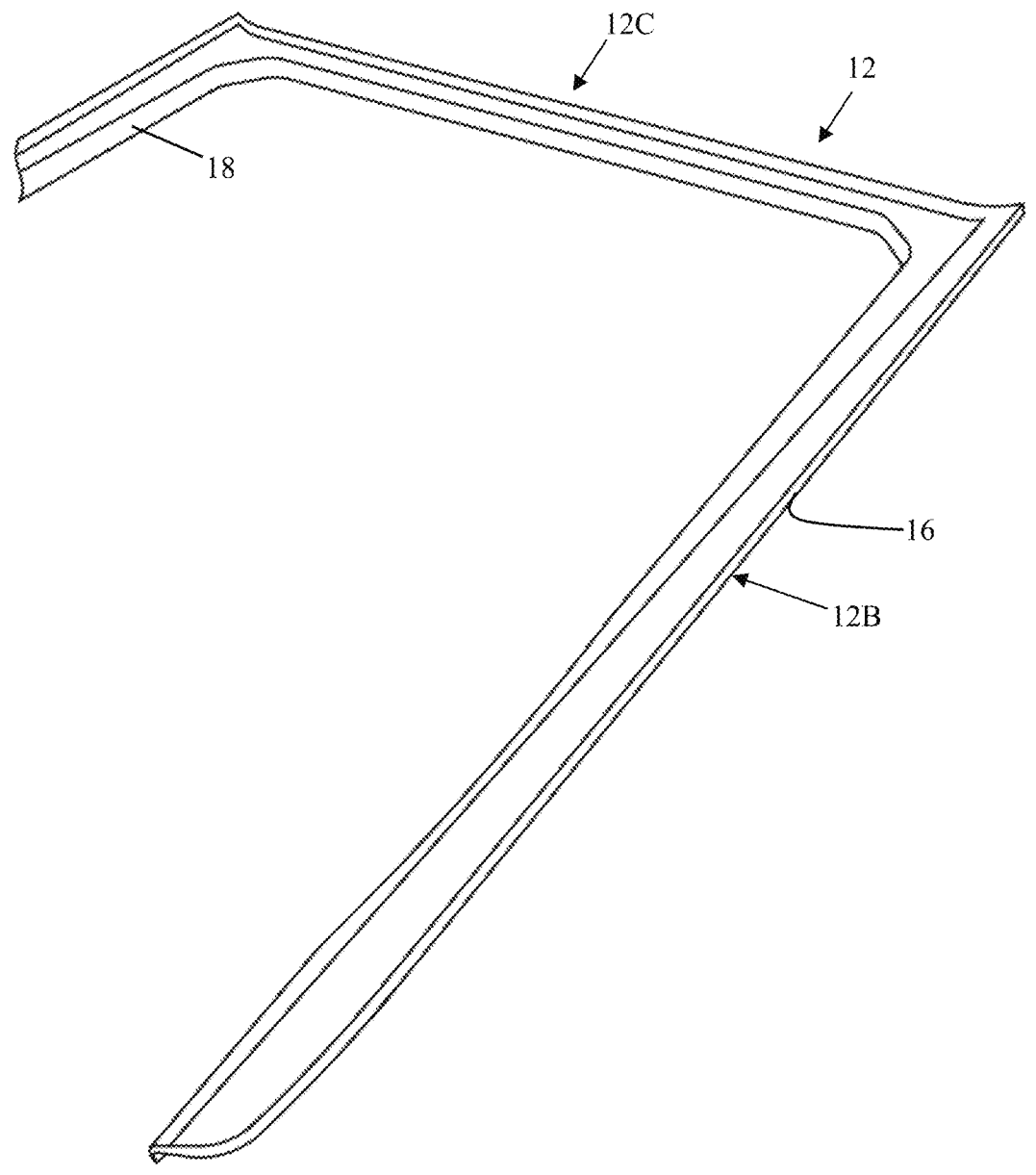
FIG. 3B is a right side perspective of the base.

Referring to FIGS. 1, 2, 3A, and 3B, the truck cap 10 comprises a composite base 12 (broadly, "base") and a composite top 14 (broadly, "top") coupled to the composite base 12 to form the truck cap 10 more generally. The term "composite" as used herein refers to a structure formed from two or more materials that are integrated together. For example, a "composite" structure may be formed from a fiber reinforced polymer, such as fiberglass or carbon fiber reinforced with a resin that is mixed with a catalyst to harden the resin. Referring to FIGS. 3A and 3B, the base 12 includes a left side 12A having a front end portion and a rear end portion, a right side 12B having a front end portion and a rear end portion, and a front 12C extending between the front end portions of the left and right sides, generally forming a U-shape or horseshoe shape configuration. The left and right sides 12A, 12B define a length dimension and the front 12C defines a width dimension of the base. The left and right sides 12A, 12B are generally identical and include mirroring features; however, depending on the type of truck to which the truck cap 10 is configured for use with, the left and right sides may differ. In the illustrated embodiment, the total length of the base is about 60 inches and the total width is about 64 inches.

Figure 21:
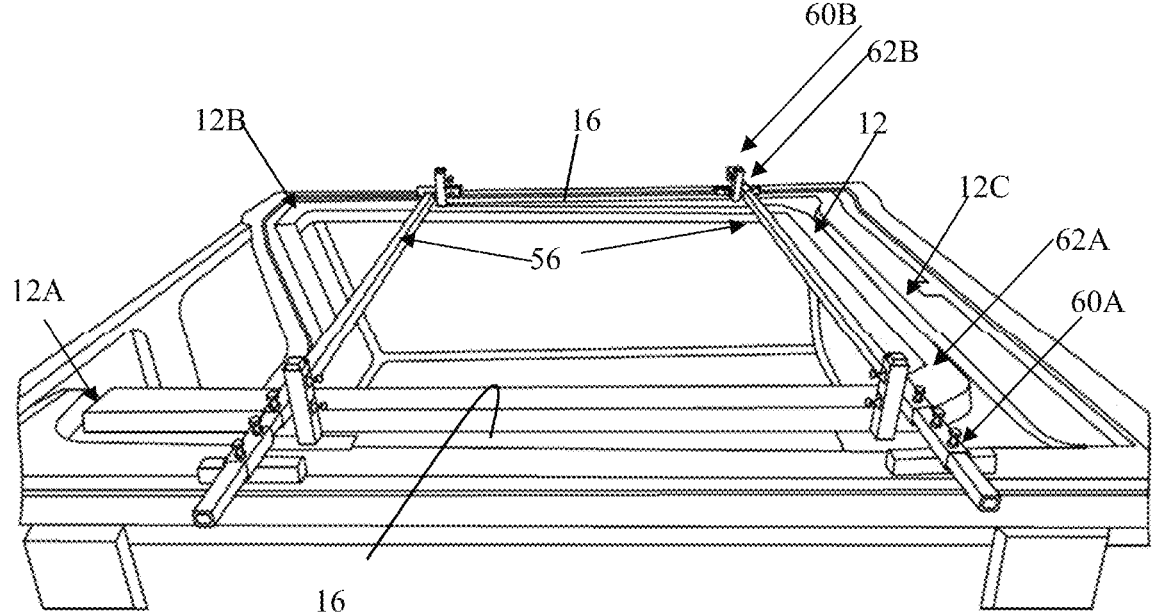
FIG. 21 shows jigs holding the base of the truck cap in the mold.
Figure 22:
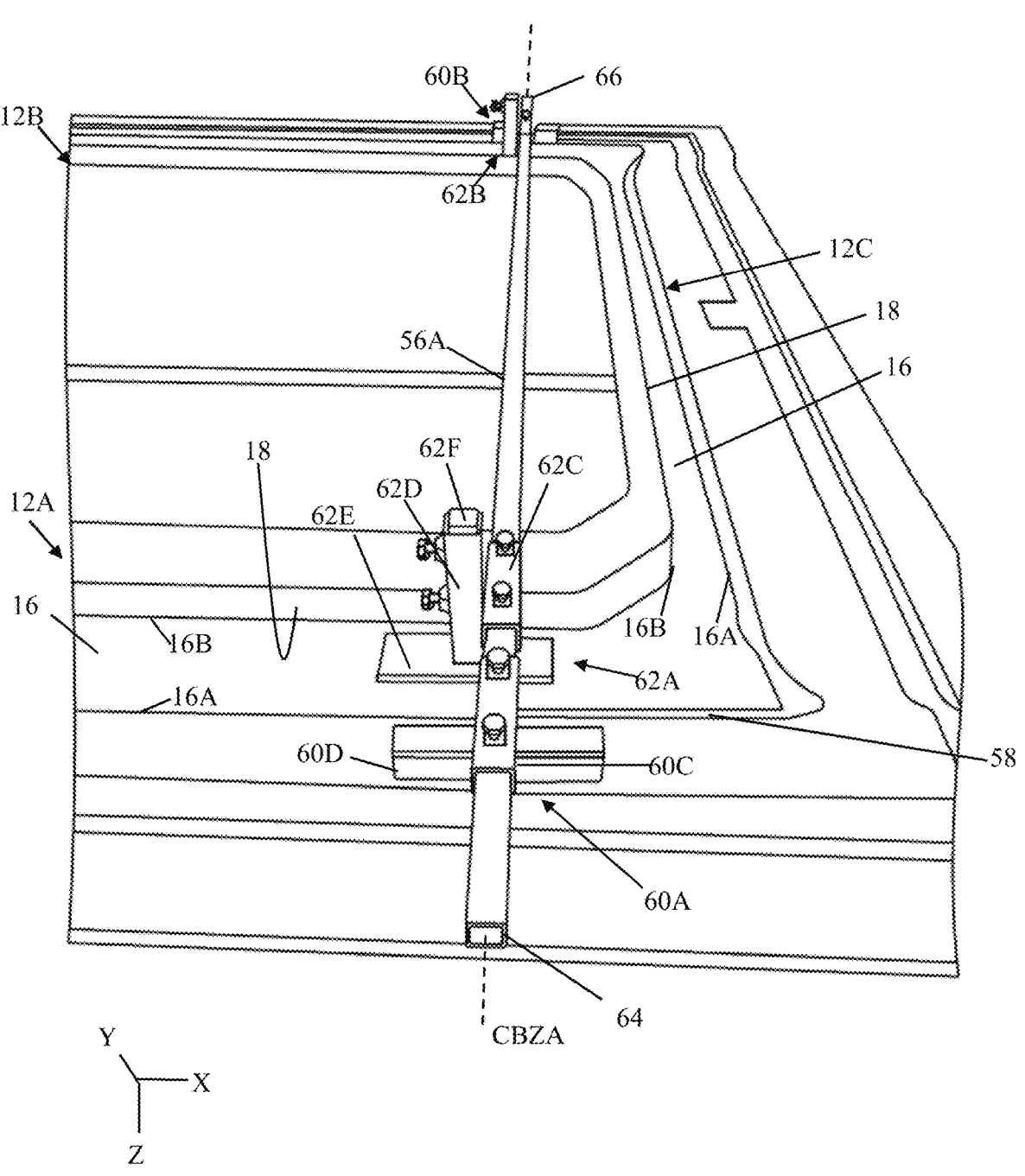
FIG. 22 is a close-up view showing one of the jigs shown in FIG. 21.
Figure 23:
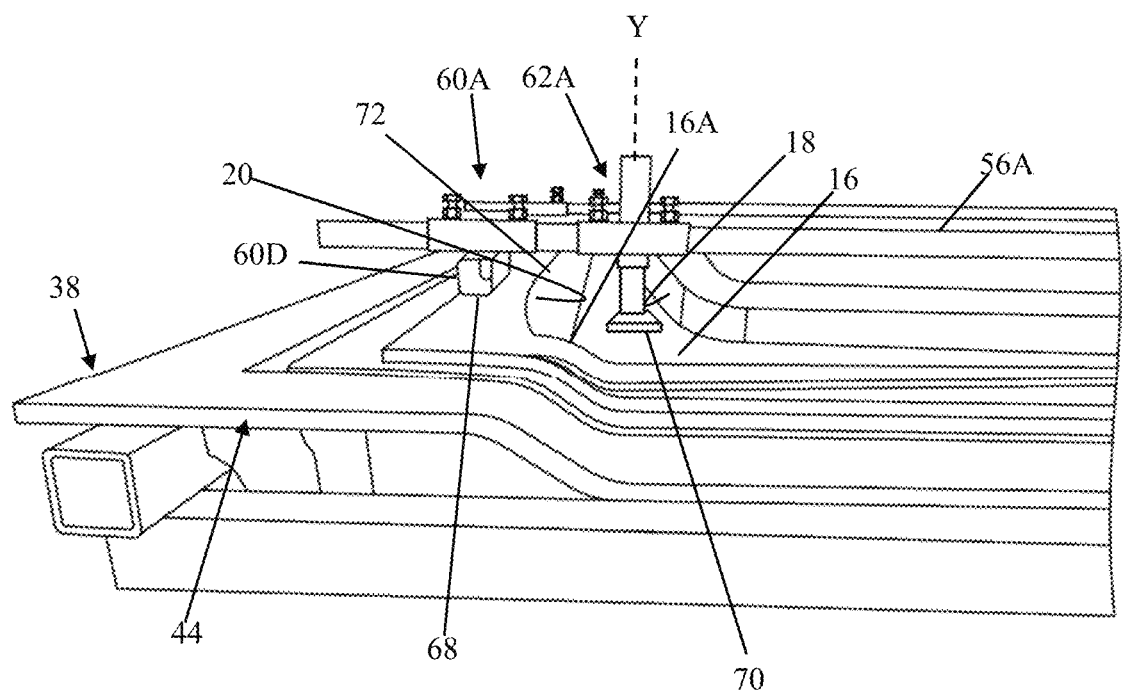
FIG. 23 is an elevation view showing an inner foot of the jig on the base of the truck cap and an outer foot of the jig on a flange of the mold.

Referring to FIG. 21-23, the base 12 is shown as being positioned in a mold for joining to the top 14. Referring to FIG. 21, the underside of the base is shown facing upward, the left side 12A of the base is in the foreground, the right side 12B of the base is in the background, and the front 12C of the base is to the right and extending into the page. The left, right, and front indicators used herein are to indicate directions when the truck cap is mounted to the truck, with the left being the side to a person's left when standing at the rear of the truck and facing the bed and cab, the right being the side to the person's right, and the front being directly in front of the person adjacent the cab.

Figure 24:
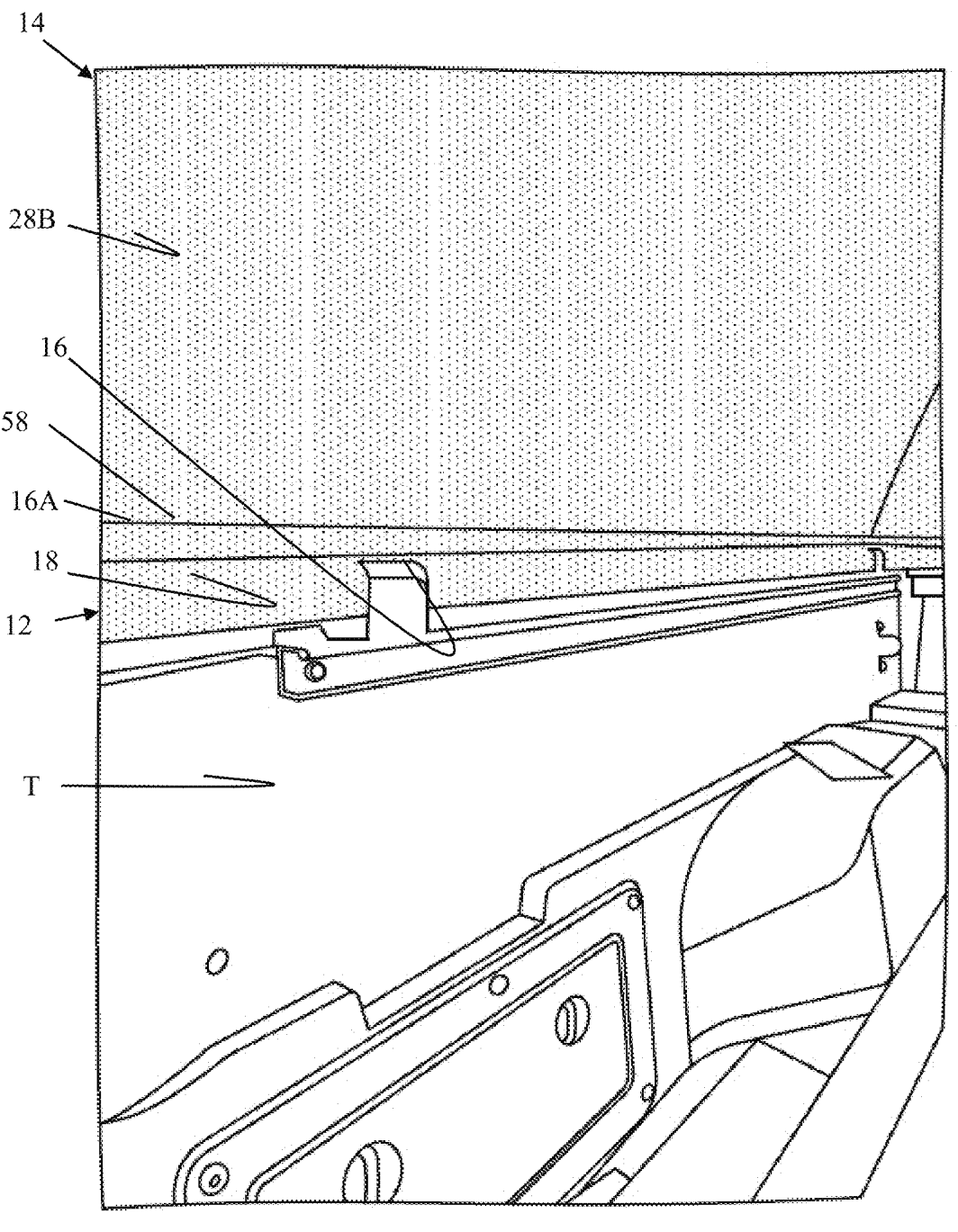
FIG. 24 is a view showing the left side of the base mounted to a left side bed rail of a truck.

Referring to FIGS. 3A, 3B, and 22, in general, the base 12 comprises a mounting surface 16 having an outer peripheral edge 16A, an inner peripheral edge 16B, and a flange 18 extending downward from the inner peripheral edge. Although FIGS. 21-23 show the flange extending upward from the inner edge, "downward" is used herein to refer to the direction that the flange 18 extends when the truck cap is mounted on a truck. Conversely, FIGS. 3A, 3B show the base oriented right-side up and shows the flange 18 extending downward. Referring to FIGS. 21 and 22, the left side 12A will be described in greater detail with the understanding the right side 12B includes similar but mirroring features. The outer peripheral edge 16A is configured to be secured to a lower portion of the top 14 such that a lip 20 (FIGS. 23 and 24) (broadly, "edge portion") of the composite top 14 overhangs (or extends downward from) the outer peripheral edge 16A of the base 12, as will be described in greater detail herein. The mounting surface 16 is sized and shaped to engage with the bed rails of the truck, as shown in FIG. 24. In other words, the mounting surface 16 has a width slightly greater than the width of the bed rail on top of the sidewalls of the truck and a length to span the entire length of the sidewall of the truck. In the illustrated embodiment, the width of the mounting surface is about 3.5 inches, which accounts for the 3.25-inch width base rail of the Tacoma truck. The flange 18 extends downward from the inner peripheral edge 16B of the mounting surface 16 and faces toward the lip 20 (FIG. 23). In the illustrated embodiment, the flange 18 extends downward 1.25 inches from the mounting surface 16; however, the distance the flange extends can vary depending on the truck model for which the base is designed, as shown in FIG. 24. The lip 20 extends downward 1 inch relative to the mounting surface 16; however, the distance the lip extends can also vary depending on the truck model. In some embodiments, the lip 20 can extend downward from the mounting surface within the inclusive range of about 0.75 to 1.25 inches. Referring to FIGS. 23 and 24, the mounting surface 16 is spaced above (when the truck cap is mounted on a truck) the lowermost edge of the lip 20 and the lowermost edge of the flange 18 defining a gap (broadly, "opening") therebetween. The configuration is such that the bed rail on top of the sidewalls of the truck is received by the opening, as shown in part in FIG. 24.

It is with the understanding that the right side 12B of the base comprises similar but mirroring features for corresponding with the right sidewall of the truck. For example, the right side 12B also includes the mounting surface 16, the outer peripheral edge 16A, the inner peripheral edge 16B, and the flange 18 extending downward from the inner peripheral edge.

Referring to FIG. 22, the front 12C of the base forms a connection between the left and right sides 12A, 12B and is configured for corresponding to the front wall of the cargo area of the truck. The front 12C has similar features as the left side 12A described above. For example, the front 12C includes the mounting surface 16, the outer peripheral edge 16A, the inner peripheral edge 16B, and the flange 18 extends downward from the inner peripheral edge. However, the width of the mounting surface of the front 12C is slightly narrower than that of the sides to correspond with the top of the front wall of the cargo area. Depending on the truck, the front 12C may be formed to have the same width as the sides or a greater width. In the illustrated embodiment, the width of the mounting surface 16 of the front 12C is about 2.75 inches. The flange 18 is chamfered where it transitions from the front 12C to the left and right sides 12A, 12B, and the mounting surface 16 is wider near the corners as the mounting surface transitions from the front to the sides. The configuration assists in mounting to the corners of the cargo area of the truck where the front wall meets the sidewall. It is within the scope of the invention for the base 12, including the mounting surface 16 and flange 18, to have different configurations than as described above for mounting to a different type of truck. For example, the mounting surface 16 may be configured with different widths and lengths than shown in the drawings to mount on the bed rails of any type of truck.

Referring to FIGS. 3A and 3B, the base 12 is a composite material comprising first and second layers 22A, 22B of fiberglass mat (broadly, "fiber mat") impregnated with a resin 24. Each fiberglass mat is a double-sided stitched fiberglass mat, such as fiberglass mat material sold by Chromarat. The first layer 22A has a weight per area of 450 grams/square meter, and the second layer 22B has a weight per area of 750 grams/square meter. A ratio of the weight of the first and second layers of fiberglass mats 22A, 22B of the base 12 to a weight of the resin 24 used for the base is within the inclusive range of 50% fiberglass mat material to 50% resin; 55% fiberglass mat material to 45% resin; and desirably 60% fiberglass mat material to 40% resin. A resin mixture, referred to herein as "resin," includes Corezyn® 55 and 2% of a catalyst by weight. The "resin" referred to herein may include any type of suitable polymer and/or catalyst for forming a fiberglass product. Once the resin has cured and the part is formed, for example, FIGS. 3A, 3B, it is difficult to visually see the separation between the first and second layers 22A, 22B.

The fiberglass mats referred to herein are also known as Chopped Strand Mats (CSM), which is a non-woven material including glass fibers laid randomly across each other and held together with a resin binder. Other types of fiberglass mats having different weights per area and construction may be used instead of the fiberglass mats specifically described herein. Further, any type of fiber mat may be used for the truck cap 10 described herein instead of the fiberglass mats referred to herein. For example, the "fiber mat" described herein may include carbon fibers, aramid fibers, fiberglass, or any other suitable type of fibers that are woven, knit, or randomly oriented in the mat. As is generally understood in the art, fiber mats have first and second sides with relatively large surface areas as compared to a thickness of the mat extending from the first side to the second side.

Referring to FIGS. 1, 2, and 24, the composite top 14 comprises a front wall 26A, a rear wall 26B opposite the front wall, a left wall 26C, a right wall 26D opposite the left wall, and a roof 26E supported atop the walls. In the illustrated embodiment, the left and right walls 26C, 26D may include openings into which windows or storage compartments can be installed. Moreover, the rear wall 26B defines a cutout, or opening, into which a rear window (e.g. moveable or pivotable window) can be installed. The roof 26E is sized and shaped to overlie the truck bed and the side walls extend downward and slightly outward therefrom so to match the side profile of the truck cab. Moreover, the front wall 26A is sized and shaped to correspond with the rear wall, or rear window, of the truck cab above the bed. The front wall 26A, rear wall 26B, left wall 26C, and right wall 26D may broadly be referred to herein as a sidewall of the truck cap 10 extending downward from the roof 26E.

Figure 19A:
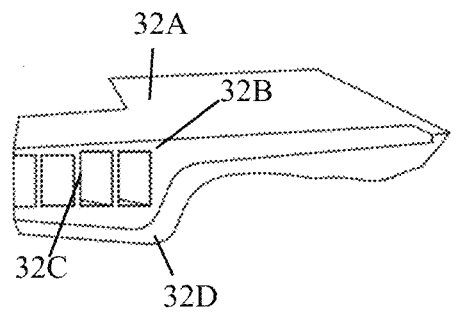
FIG. 19A is a cross section of a portion of a truck cap formed from an open mold process.
Figure 19B:
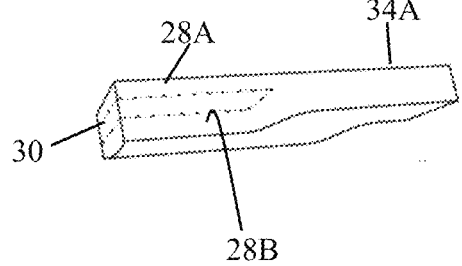
FIG. 19B is a cross section of a portion similar to 19A but of a truck cap formed from a closed mold process.

As will be described in greater detail below, and as best shown in FIG. 19B, the truck cap 10 is formed from a composite material comprising an outer (first) layer of fiberglass mat 28A (broadly, "fiber mat"), an inner (second) layer of fiberglass mat 28B (broadly, "fiber mat"), and a foam core 30 (broadly, "reinforcement layer") sandwiched therebetween in the roof 26E of the top. In the illustrated embodiment, each fiberglass mat is a double-sided stitched fiberglass mat. As a non-limiting example, the foam core can be a Gurit FGPET100G-3190 foam core.

FIG. 19A, shows a cross section taken from the roof portion of a truck top made from an open cavity molding process. Shown in the cross section is a cured gel coat 32A on the "A-side," a first layer of fiberglass chop material 32B, a reinforcement material 32C such as corrugated, or honeycomb, cardboard, and a second layer of fiberglass chop material 32D applied thereover forming a "B-side" of the part. As best illustrated by FIG. 19A, small pockets of air and uneven surfaces are formed when using the open-mold process. Referring to FIG. 20A, and as generally known by those skilled in the art, loose strands may not lie flush when applied over a curve or a bend resulting in free-ends of the loose strands jutting out from the second layer of chop material 32D of the B-side of the part. As known by those skilled in the art, A-side refers to the side of the part that contacts the mold surface, and the B-side is opposite the A-side.

FIG. 19B shows a similar cross section taken from the roof portion of the truck cap 10 made from the CCBM process. Shown in the cross section is a cured gel coat 34A on the A-side, the first layer of fiberglass mat 28A, the foam core 30, and the second layer of fiberglass mat 28B forming a B-side of the part. As shown in the cross-section, the foam core bisects the layers 28A, 28B, however; it is difficult to visually distinguish the layers outside of the foam core where the remainder of the roof, and eventually the continuous sidewall is formed. As best illustrated by FIG. 19B, the part is free from air pockets, has a substantially uniform thickness where the foam core is sandwiched, a smooth transition at the edge of the foam core, and a substantially uniform thickness outside of the foam core. As best shown in FIG. 20B, the B-side of the second layer fiberglass mat 28B is smooth with no fiberglass strands jutting out therefrom. When the cap 10 is mounted to the truck, the B-side faces the cargo area. Persons of ordinary skill in the art of closed-cavity bag molding will generally recognize the truck cap 10 as a product of a closed-cavity bag molding process based on visual inspection of the smooth finish, which lacks jutting free-ends of glass stands, as typically shown in an open mold product, as shown in FIG. 24. As a non-limiting example, the gel coat 34A can be a B-1289F-LIUN Gray Low VOC Sanding Primer. The gel coat described herein may be any suitable coating applied to a mold that facilitates release of a composite material from the mold.

Figure 4:
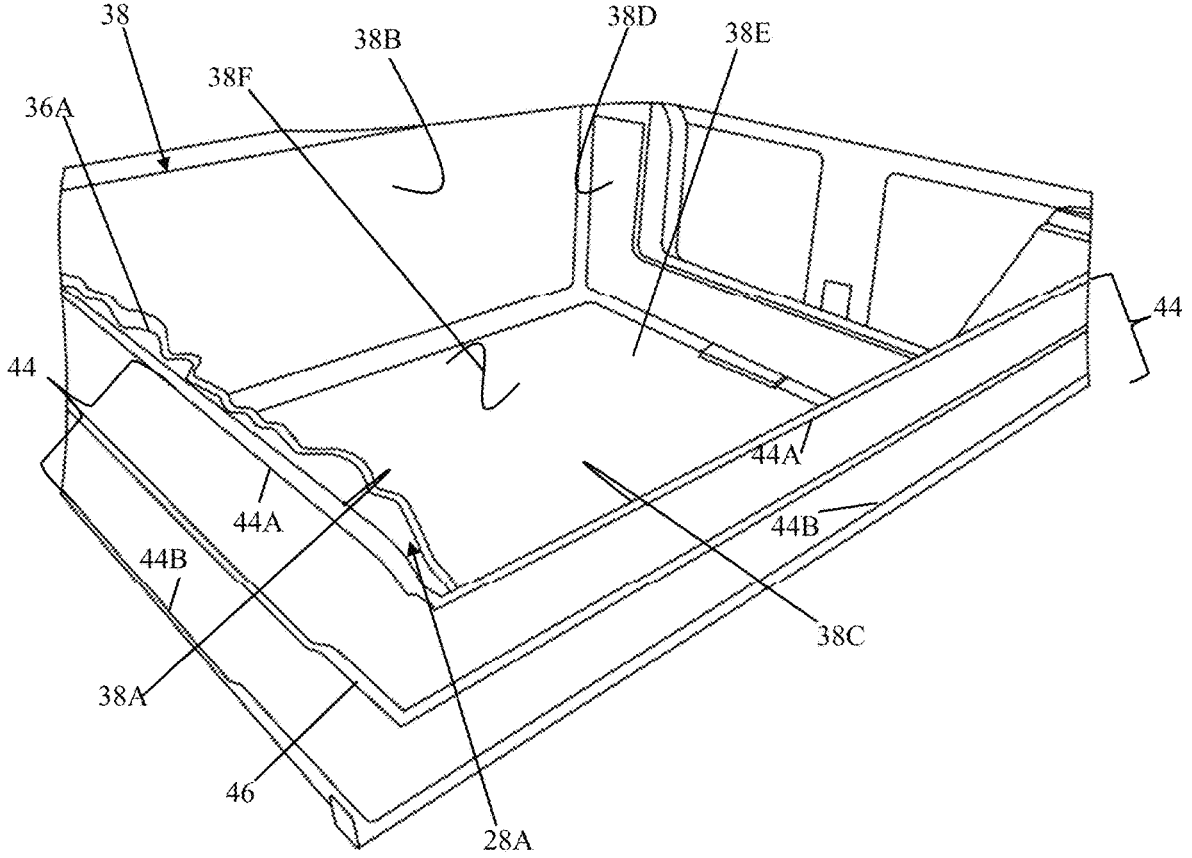
FIG. 4 is a perspective of a mold cavity defined by sidewalls and a roof portion.
Figure 5:
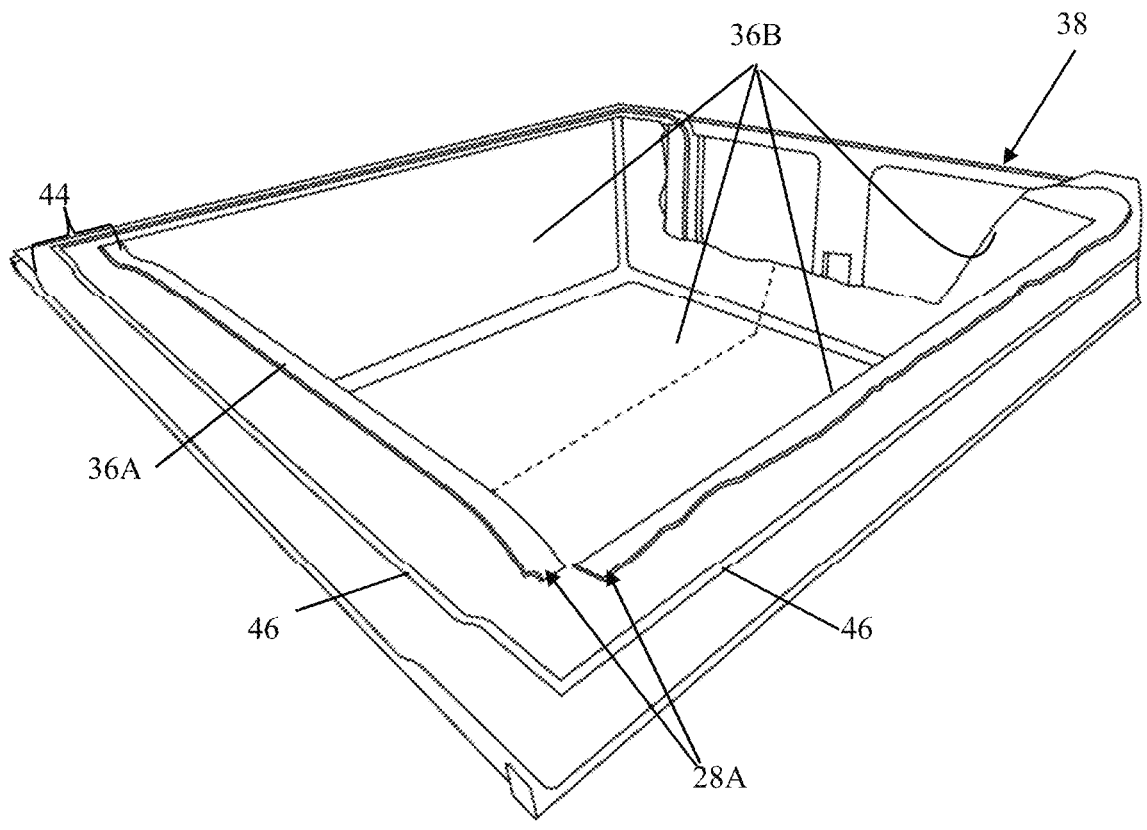
FIG. 5 is a perspective of a first layer of fiberglass mat pressed against the walls of the mold cavity.

In the illustrated embodiment, the first layer of fiberglass mat 28A has a weight per area within the inclusive range of 400 to 500 grams/square meter, and in one embodiment it may be 450 grams/square meter. Referring to FIGS. 4 and 5, the first layer 28A is made up of a first piece 36A (FIG. 4), and a second precut piece 36B (FIG. 5). Illustrated in at least FIGS. 4 and 5, the mold 38 includes a front wall 38A, a left side wall 38B, a right side wall 38C, a rear wall 38D, and a roof portion 38E. The walls 38A-38E and roof portion 38E define a cavity 38F. As will become apparent, each piece is precut to cover certain regions of the mold. FIG. 4 shows the first piece 36A covering the front wall 38A and FIG. 5 shows the second piece 36B covering the side walls, rear wall, and roof portion 38B-38E. The first layer 28A may be made from any number of pieces instead of two, e.g. one, three, four, or more.

Figure 8:
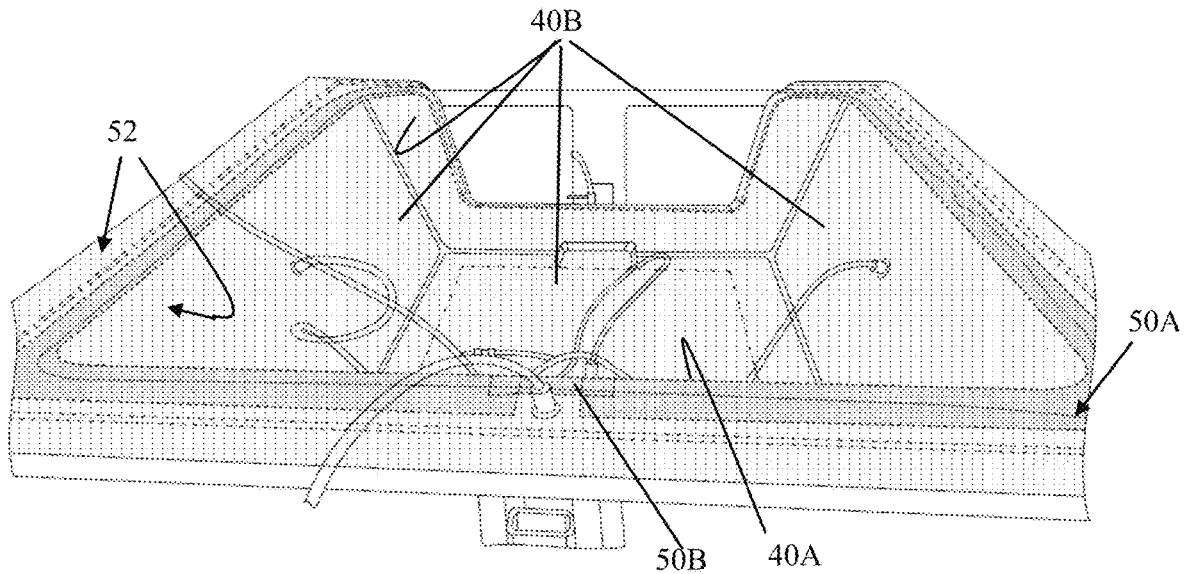
FIG. 8 is a front perspective showing a cover covering layers of fiberglass mat in the mold cavity.

In the illustrated embodiment, the second layer of fiberglass mat 28B has a weight per area within the inclusive range of about 700 to 800 grams/square meter, and in one embodiment it may be 450 grams/square meter. Similarly, the second layer 28B is made up of a first precut piece 40A and a second precut piece 40B sized and shaped to lie over the first layer 28A. As best illustrated in FIG. 8, the first and second pieces 40A, 40B of the second layer 28B are lying under silicone cover 52 (indicated by the lighter shading). The first and second pieces 40A, 40B of the second layer 28B overlie the first and second pieces 36A, 36B of the first layer 28A. Like the first layer, the second layer may be made from any number of pieces. In the illustrated embodiment, the combined weight of the first and second layers of fiberglass is 38 pounds; however, the weight of the layers may be any suitable weight. Any type of fiber mat, as described above, may be used instead of the first and second fiberglass mat layers 28A, 28B.

Figure 6:
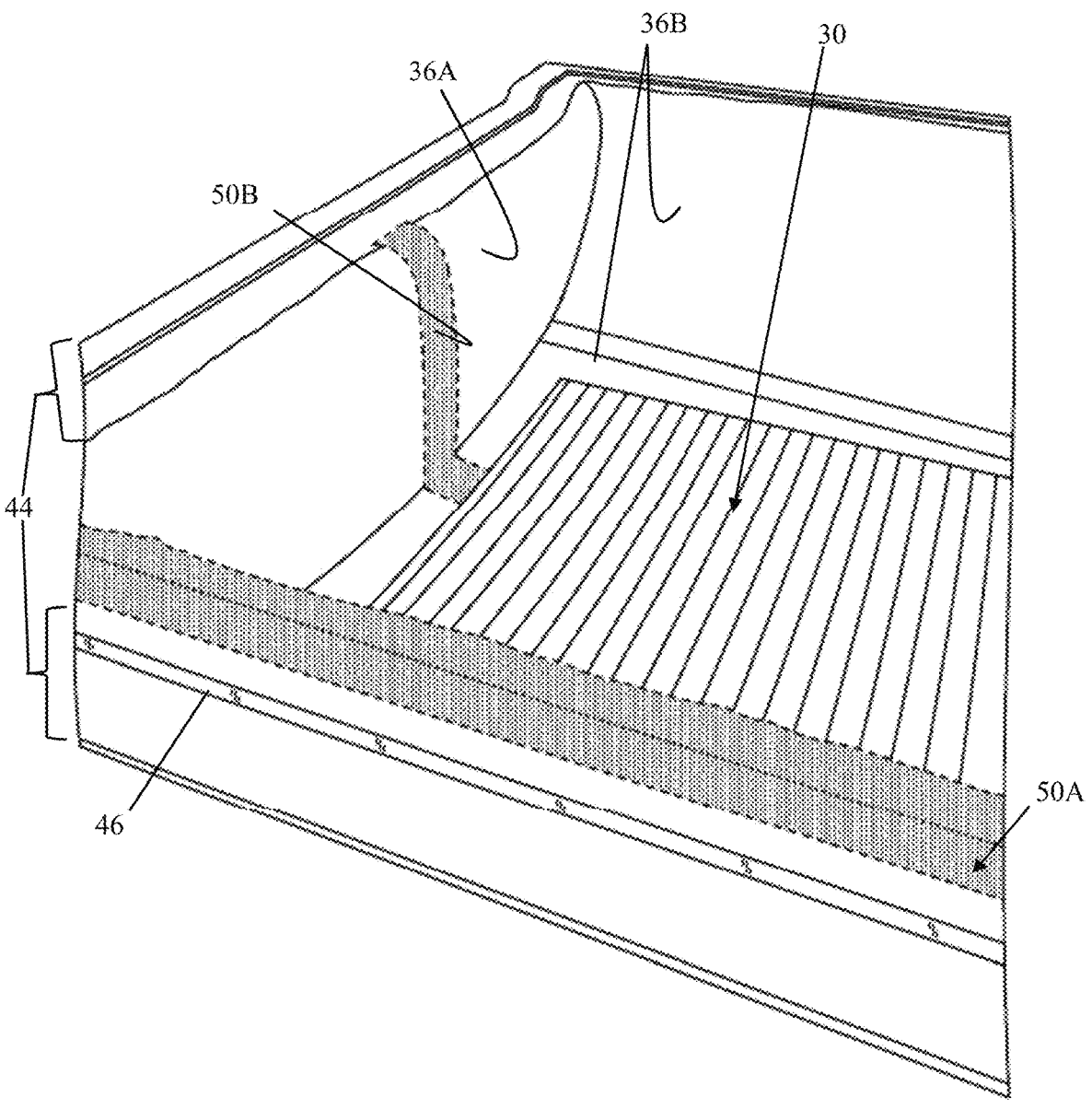
FIG. 6 is a perspective similar to FIG. 5, but with a foam core laid over the first layer of fiberglass mat at the roof portion of the mold.

Referring to FIG. 6, the foam core 30 is a polyethylene material sized and shaped to be positioned over the first layer 28A, specifically the second portion 36B which overlies the roof portion 38E of the mold. In the illustrated embodiment, the foam core 30 has a dimension of 36 inches by 52 inches and weighs 1 pound. In the illustrated embodiment, a predetermined amount of resin 42 weighs 29 pounds and is used to hold the mats and foam core together. A ratio of the weight of the fiberglass mats 28A, 28B and core 30 to the weight of the resin 42 is within the inclusive range of 50% fiberglass mat material to 50% resin; 55% fiberglass mat material to 45% resin; and desirably 60% fiberglass mat material to 40% resin. Any other suitable type of material may be used for the foam core other than that described herein.

Figure 7:
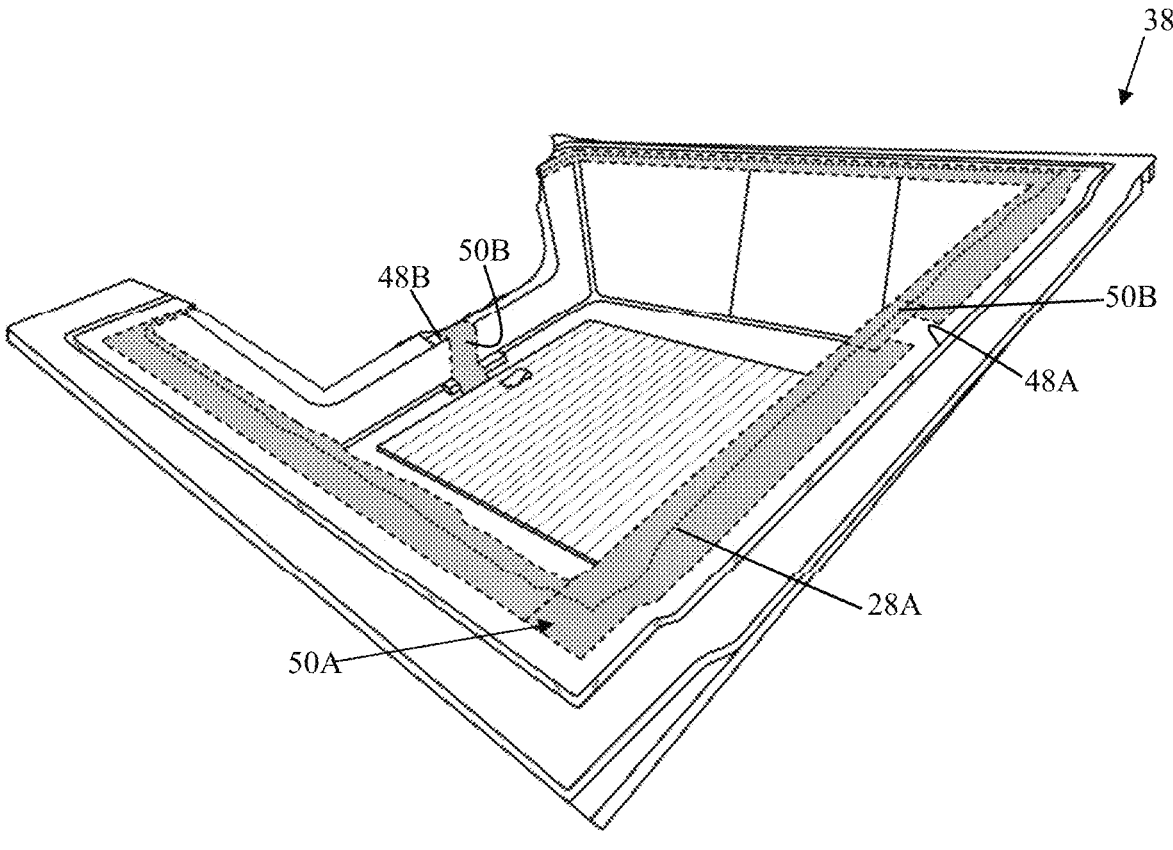
FIG. 7 is a perspective similar to FIG. 6.
Figure 9:
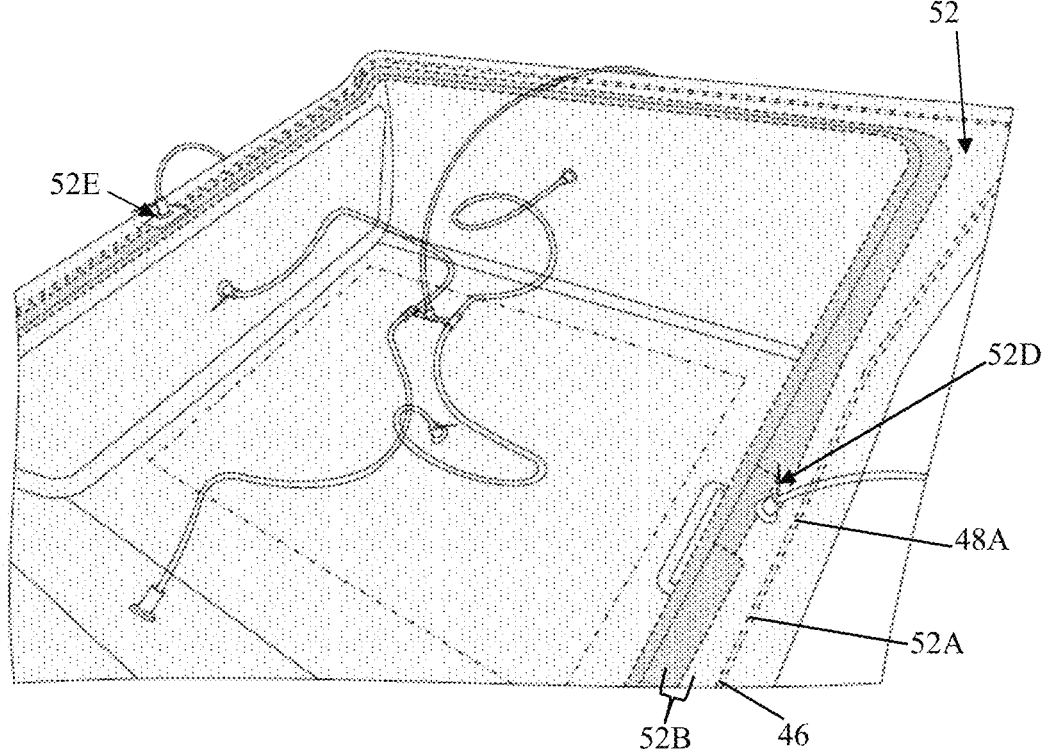
FIG. 9 is a perspective similar to FIG. 8.
Figure 10:
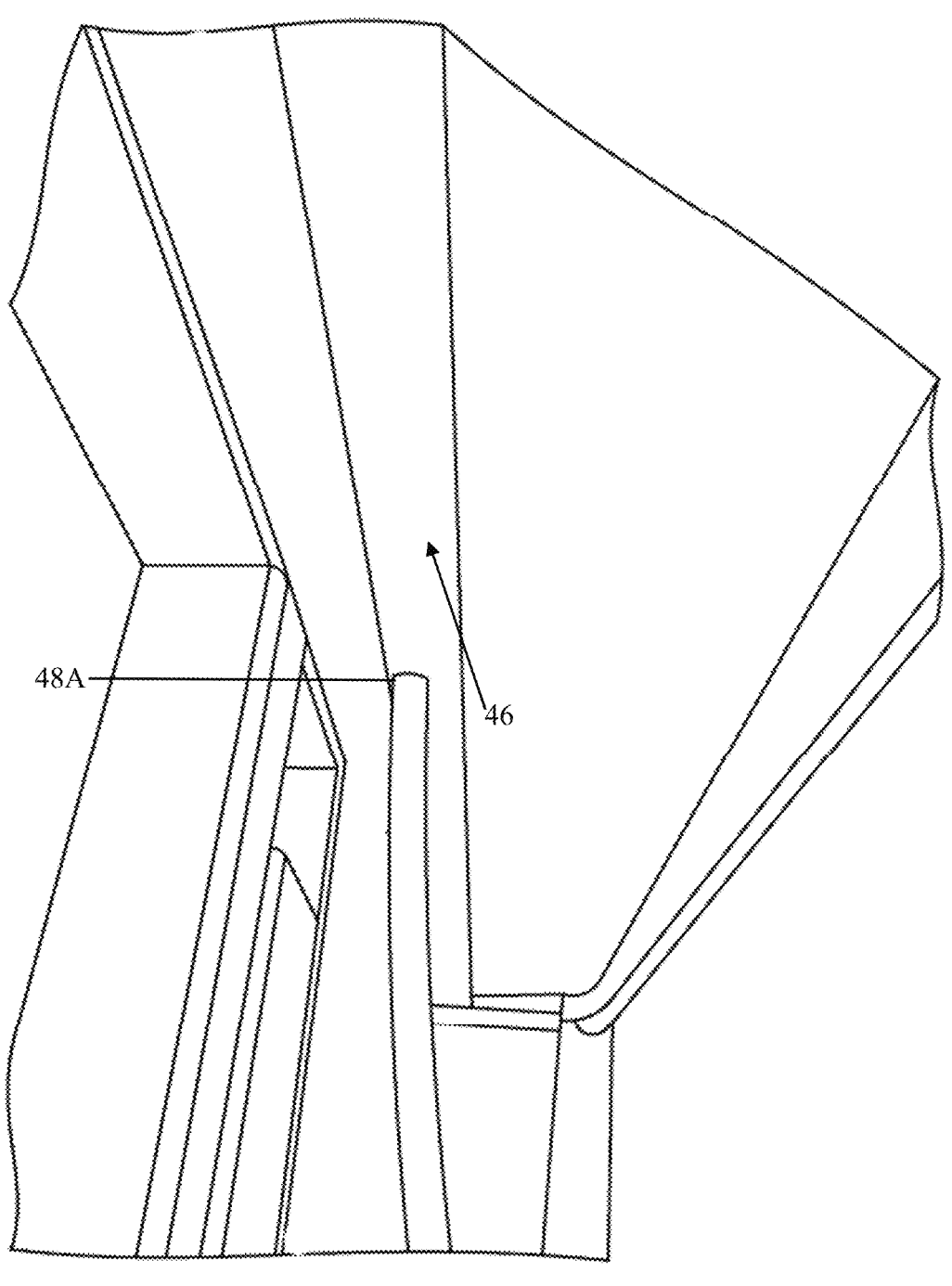
FIG. 10 is an upward looking perspective of a first seal port of the mold shown from an underside of the mold.
Figure 11:
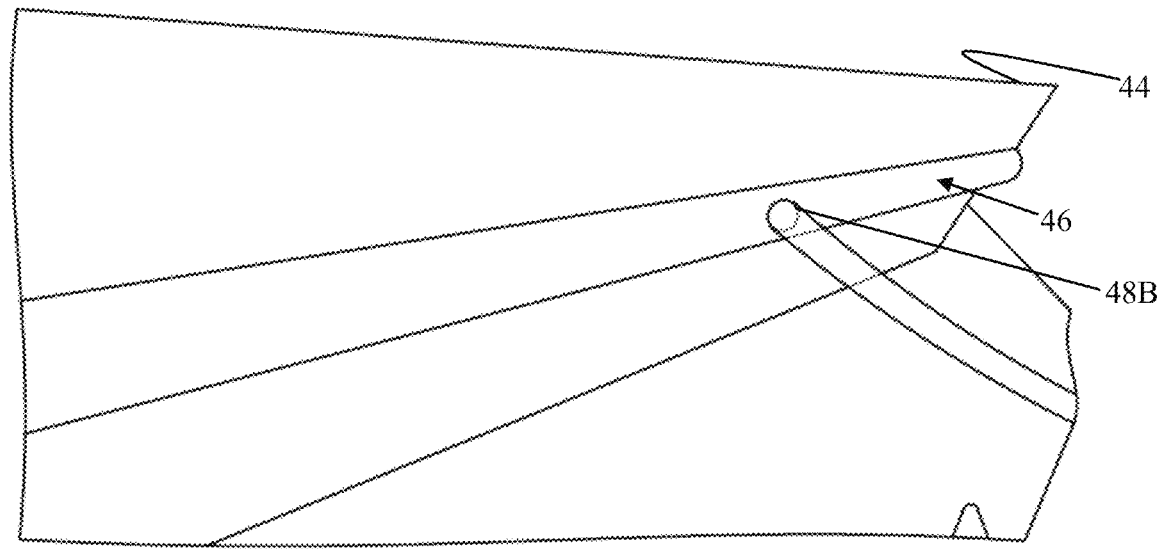
FIG. 11 is an upward looking perspective of a second seal port of the mold shown from an underside of the mold.
Figure 12:
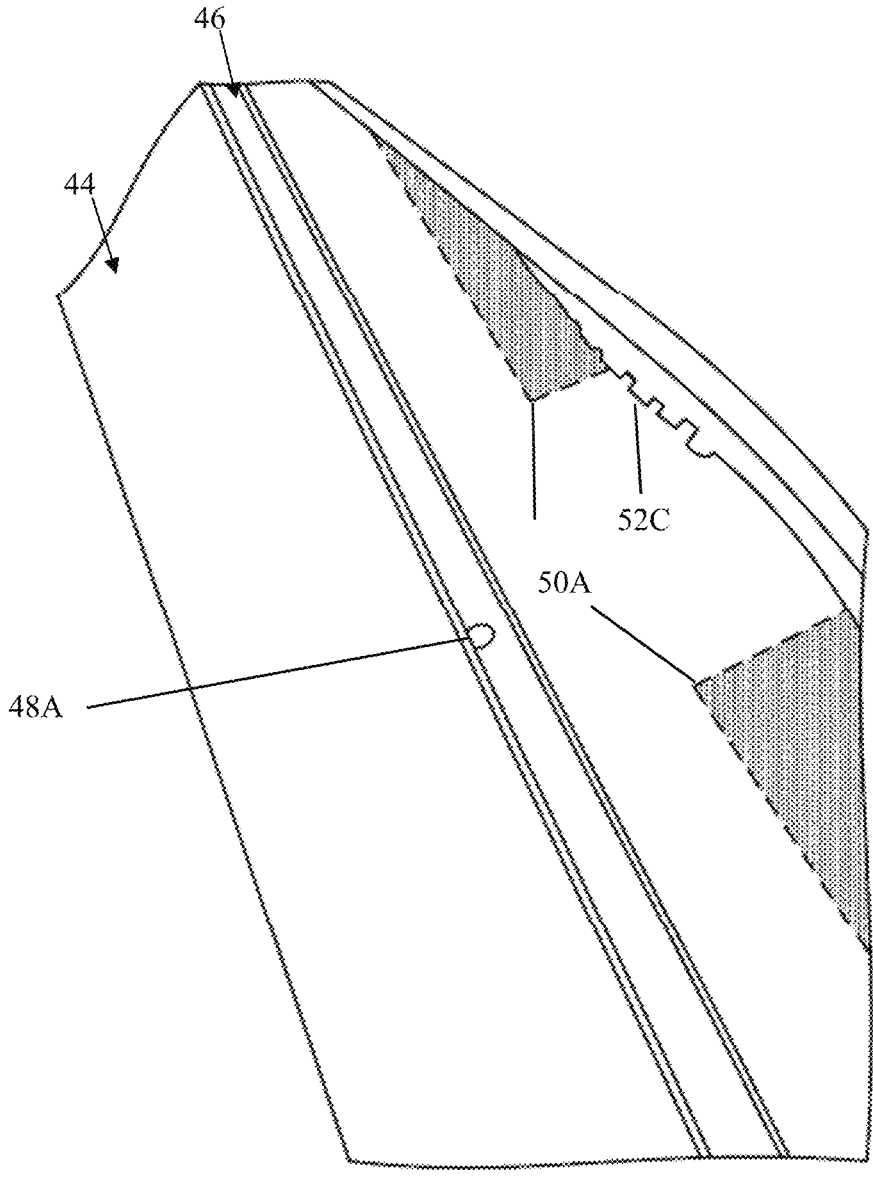
FIG. 12 is a downward looking perspective of the first seal port shown from a topside of the mold.

A closed-cavity bag molding process is used to form the top 14. As noted above, the truck top mold 38 is a female mold and includes a cavity 38F defined by the roof portion 38E, the front wall 38A extending upward from the roof portion, the rear wall 38D opposite the front wall extending upward from the roof portion, the left wall 38B extending upward from the roof portion, and a right wall 38C opposite the left wall, which also extends upward from the roof portion. The roof and walls are continuous sharing a common surface. Referring to FIGS. 4-6, the mold 38 comprises a flange 44 extending generally perpendicularly outward from upper edges of the walls around the perimeter of the mold. As best shown in FIG. 4, the flange 44 has an inner edge 44A where it meets the upper edges of the walls of the mold, and an outer edge 44B spaced laterally outward from the inner edge. In the illustrated embodiment, the flange 44 has a dimension of 9 inches measuring between the inner and outer edge. As shown in FIGS. 4-18, but referring to FIG. 4, a V-groove 46 (broadly, "slot") is defined by the flange 44 and extends around the perimeter of the flange between the inner and outer edges. The slot extends downward from an upper surface of the flange. The slot 46 is located about 4.5 inches from the inner edge of the flange. Referring to FIGS. 7 and 9, a first seal port 48A is defined by the bottom of the slot, and is located adjacent the front wall of the mold. Similarly, a second seal port 48B is defined by the bottom of the slot, and is located adjacent the rear wall of the mold. FIG. 10 is an upward view of the underside of the front of the mold, illustrating the first seal port 48A defined by the bottom of the slot 46. FIG. 12 is a downward view of the first seal port 48A. FIG. 11 is similar to FIG. 10, but shows the underside of the rear of the mold, illustrating the second seal port 48B defined by the bottom of the slot 46. The seal ports 48A, 48B are operable to be in fluid communication with a vacuum such that a suction force is applied to a material in the slot, as will be described in greater detail below.

Referring to FIG. 4, the first step in the closed cavity bag molding process for making the truck cap 10 includes applying a gel coat 34A to the walls 38A-38E of the mold 38. Referring to FIGS. 4 and 5, the first layer of fiberglass mat 28A is placed against the walls of the mold. In either order, the first piece 36A is placed in the mold to cover the front wall 38A (FIG. 4) and the second piece 36B is placed in the mold to cover walls 38B-38E (FIG. 5). As noted above, the first layer may alternatively be formed from a single piece of fiberglass mat.

A roller, for example, a window screen roller, is used to roll portions of the mat into curvatures of the mold. For example, the first layer is rolled over and into corners and edges of the mold (i.e., where the walls of the mold intersect) so to further assist in fitting the mat against the walls of the mold.

Figure 13:
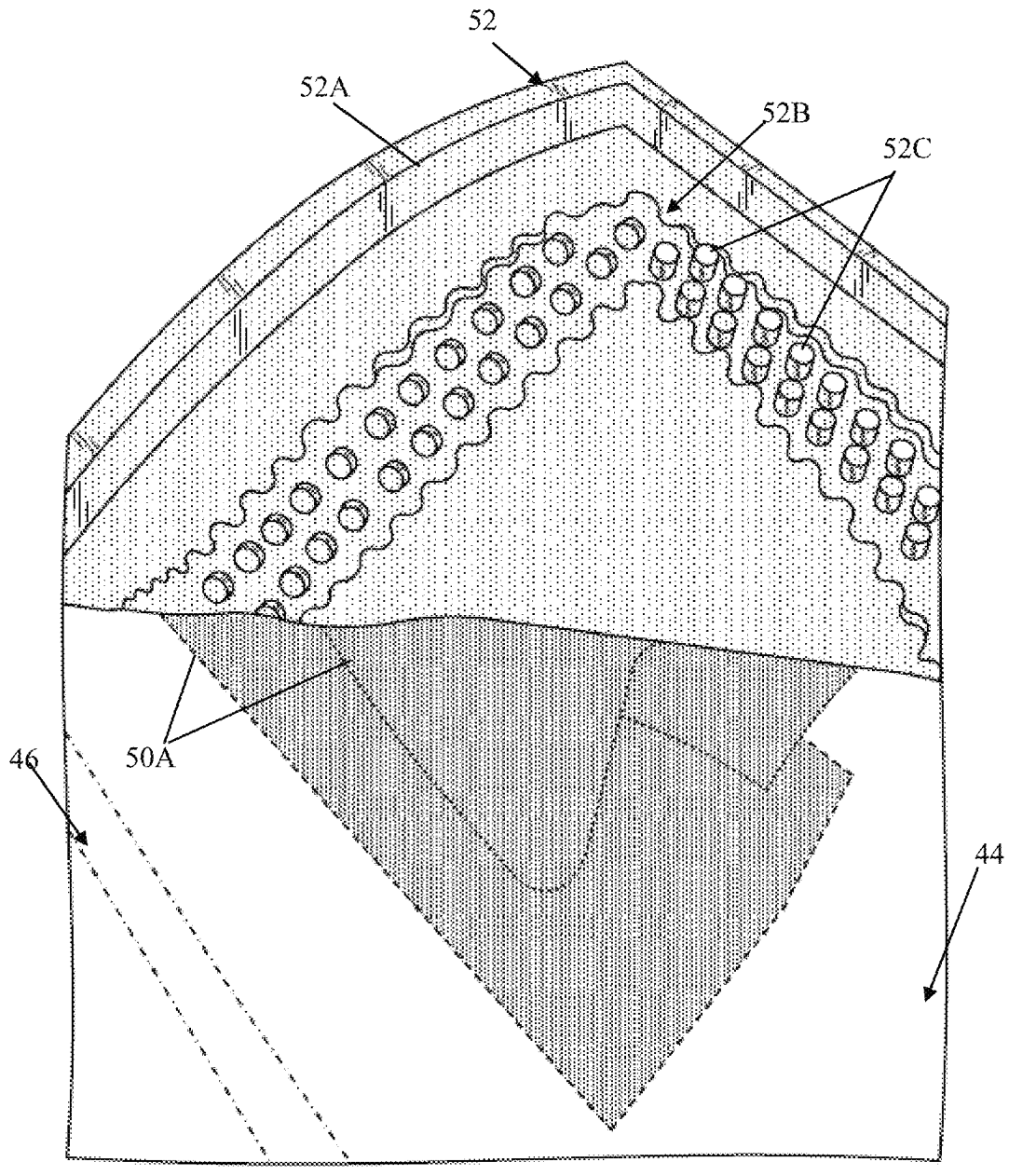
FIG. 13 is a perspective showing a corner portion of the mold with a corner portion of the cover lifted up to show the underside of the cover.

Referring to FIGS. 6-8, a bleeder strip 50A (indicated by medium shading and dash lines) is used to hold the first layer 28A in place and serves as a vent through which air can pass when a vacuum is actuated, as will become apparent. In the illustrated embodiment, the bleeder strip 50A is a 4 inch wide cloth having adhesive on one side and indicated as a dash line. The bleeder strip 50A extends around the entire perimeter of the flange. For example, as best shown in FIG. 7, the bleeder strip 50A extends across the flange 44 adjacent the front wall 38A, side walls 38B-C, and rear wall 38D of the mold. The bleeder strip 50A may be formed from multiple pieces of bleeder strip that are placed to in combination extend continuously around the entire perimeter of the flange 44. For example, pieces of bleeder strip may overlap each other at corners of the flange 44 adjacent where walls 38A-D of the mold intersect (FIGS. 7 and 13). The bleeder strip 50A extending around the perimeter of the flange 44 may be referred to as the peripheral section of the bleeder strip. Referring to FIGS. 6, 7, 8, and 14, another bleeder strip, referred to as an intermediate section 50B, is applied over a mid-portion of the first layer 28A and extends from the flange 44 above the front wall 38A, down the front wall 38A, across the roof 38E, and up the rear wall 38D to the flange 44 above the rear wall. As shown in FIGS. 6, 7, 8 and 14, the intermediate section 50B engages the peripheral section of the bleeder strip 50A extending around the perimeter. As a non-limiting example, the bleeder strips 50A, 50B can be a Nexus PFG Veil Cloth.

The foam core 30 is placed on top of at least a portion of the first layer 28A, as shown in FIG. 6, so that the reinforcement is positioned over at least a portion of the roof portion 38E of the mold. A tape measure, or other suitable measuring device, can be used to assist in centering the foam core. The foam core is positioned on top of at least a portion of the intermediate section of bleeder strip 50B that extends across the roof of the mold.

The second layer of fiberglass mat 28B is placed over the first layer 28A and the foam core 30 so that a peripheral edge of the second layer is adjacent the flange 44 and spaced apart from the slot 46 in a similar fashion in which the first layer was applied. The second layer 28B at least covers the foam core 30 and portions of the first layer that are on top of the front wall, side walls, rear wall, and roof 38A-E of the mold. The second layer 28B also extends upward from the front wall, side walls, and rear wall 38A-D of the mold to cover a portion of the first layer 28A that is positioned on the flange 44. The roller may be used again to roll the edges of the second layer 28B into the corners of the mold. It is not outside the scope of this disclosure to place the second layer in the mold first, then the foam core, then the first layer.

Figure 14:
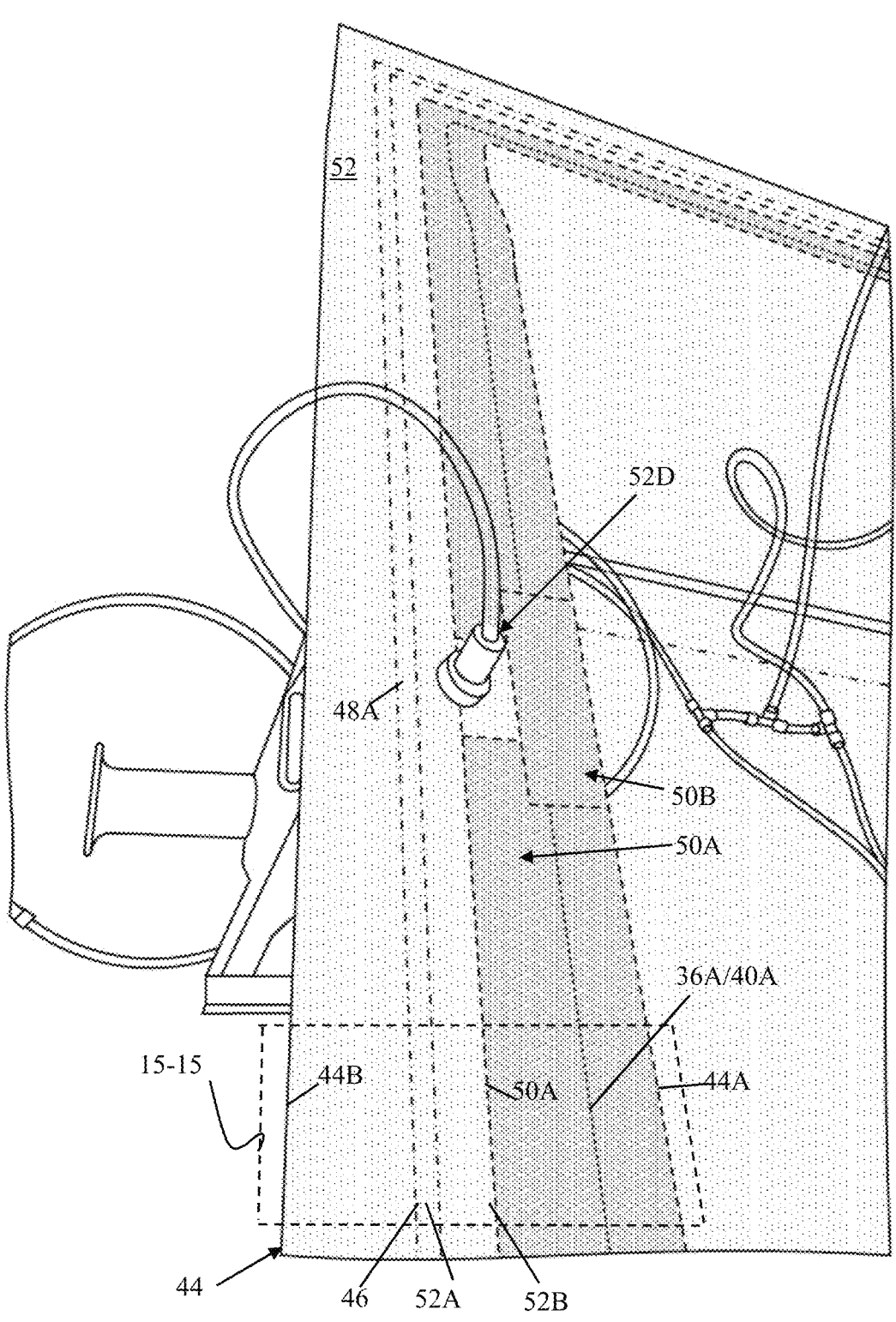
FIG. 14 is a perspective of a first vacuum port of the cover.

Referring to FIGS. 8, 9, and 14, a flexible silicon cover 52 (broadly, "cover") is sized and shaped to form fit against the walls 38A-38E of the mold and overlie the flange 44. Referring to FIG. 13, a rib 52A extends outward from an inner side of the cover 52 and extends around the entire perimeter of the cover. The rib 52A is sized and shaped to be seated into the slot 46 of the mold. As described in more detail below, the rib 52A sealingly engages the surfaces of the mold surrounding the slot 46 to prevent air from entering the fiberglass mat layers 28A, 28B under the cover 52 when resin is injected under the cover. A vent channel 52B is formed in the inner side of the cover 52 and positioned laterally inward from the rib 52A. The vent channel 52B extends around the entire perimeter of the cover. A series of spaced apart cylindrical posts 52C are positioned in the vent channel 52B. Each post 52C extends downward from an upper surface of the vent channel a distance that positions the lower surface of the post in generally the same plane as the inner side of the cover. The posts 52C are spaced apart so that air within the vent channel 52B can flow through the entire vent channel around the perimeter of the cover 52 when the cover engages the mold flange 44. The posts 52C provide structural support to the portions of the cover defining the vent channel 52B in order to keep the vent channel open for air movement therethrough when a vacuum draws air from between the cover 52 and mold 38. The vent channel 52B is about 1 inch wide and is in fluid communication with the vacuum ports of the cover, as will be described in greater detail below.

FIG. 13 illustrates the vent channel 52B overlying an edge of the bleeder strip 50A. The vent channel 52B is positioned so that when the rib 52A engages the slot 46 of the mold, a portion of the vent channel overlies the bleeder strip 50A adhered to the flange 44. Moreover, the posts 52C may be formed from shapes other than cylindrical.

Figure 15:
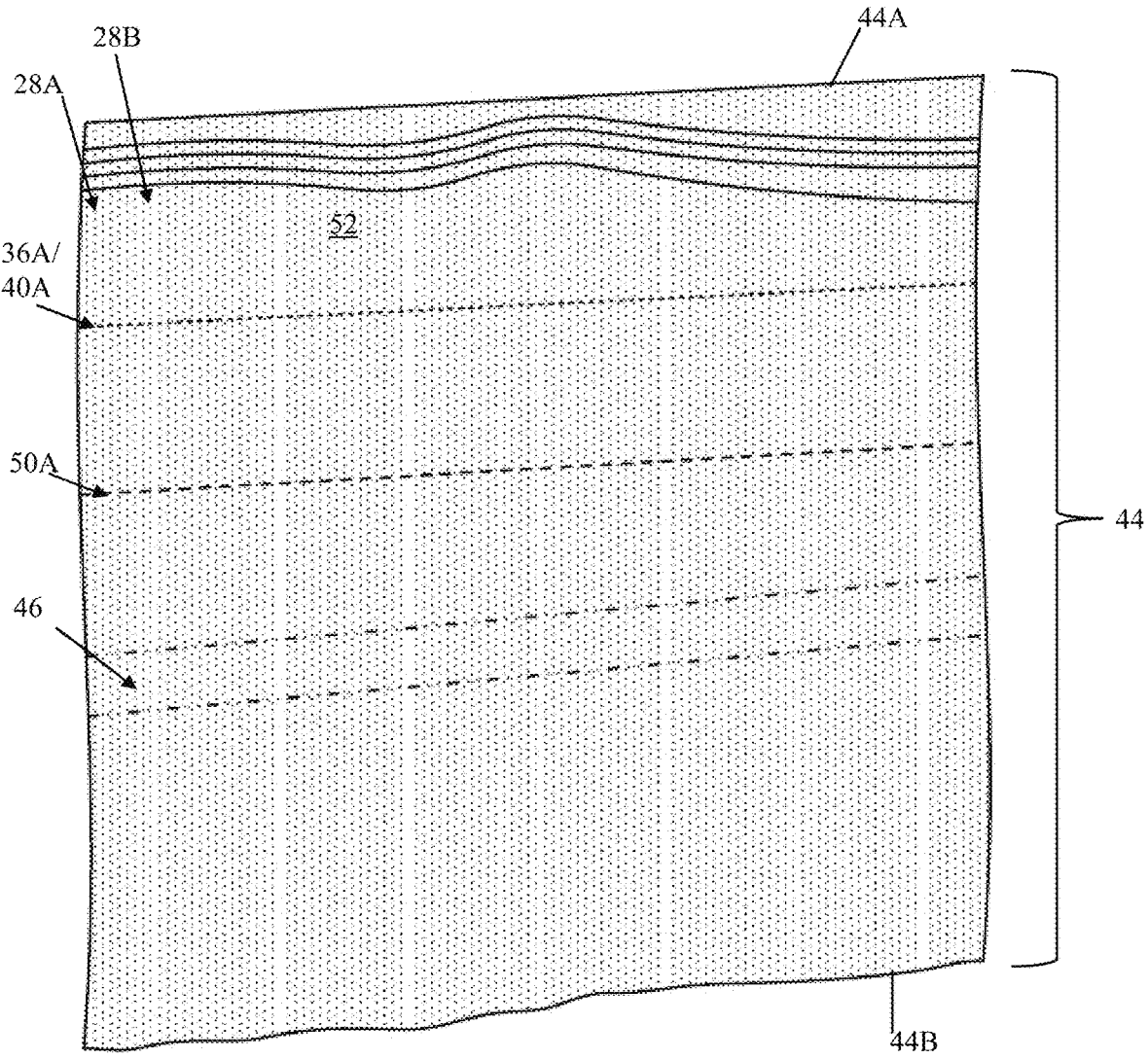
FIG. 15 is a close up view of a section 15-15 of FIG. 14.

FIG. 14 illustrates a perspective of the dimensional relationship taking place over the flange 44. FIG. 15 is a close-up top-down view taken from section 15-15 of FIG. 14, but with cover 52 (indicated by lighter shading) overlying the flange. The inner edge 44A of the flange 44 is shown at the top and the outer edge 44B is shown at the bottom. It is understood the front wall of the mold is below (into the page) the edge 44A. Outer edges of the first pieces of the first and second layers 28A, 28B are indicated by a thin dash line at reference 36A/40A. An outer edge of the bleeder strip 50A is indicated by a dash line, the inner edge is located on the front wall of the mold and out of view. About 2.5 inches of the strip is in contact with the flange 44 while the remainder is in contact with the edge of the first layer 28A. In other words, a measurement of about 2.5 inches spans from the inner edge 36A to the outer edge of the bleeder strip 50A. Thus, the bleeder strip overlies portions of the flange 44 and the portion of the first layer of fiberglass mat 28A positioned on top of the flange. These dimensions are specified for the flange of the illustrated mold; however, other dimensions are not outside the scope of this disclosure.

Referring to FIG. 9, the cover 52 has two vacuum ports 52D, 52E (broadly, "at least one"). Each port extends from the outside of the cover to the inside of the cover. Each port is configured for attachment to a tube. The tube is in fluid communication with a vacuum that is operable to draw air from between the cover 52 and mold 38 through the port and tube. As best shown in FIGS. 9 and 14, the first vacuum port 52D is arranged laterally inward from the rib 52A and slot 46 (i.e. the seal), and adjacent the first seal port 48A of the mold 38 when the cover 52 is placed on the mold (i.e., approximately midway between left and right sides of the cover 52 and positioned on top of the flange 44 adjacent the front wall 38A of the mold when the cover is on the mold). Similarly, a second vacuum port 52E of the cover is arranged on the opposite end of the mold 38 laterally inward from the rib 52A adjacent the second seal port 48B of the mold when the cover is placed on the mold (i.e., approximately midway between left and right sides of the cover and positioned on top of the flange 44 adjacent the rear wall 38D of the mold when the cover is on the mold). As described above, the vacuum ports 52D, 52E of the cover 52 are in fluid communication with the vent channel 52B in the inner side of the cover 52, which overlies at least a portion of the bleeder strip 50A extending around the perimeter of the mold 38 (indicated in FIG. 9 by a bracket at 52B). Further, the locations of the vacuum ports 52D, 52E of the cover generally align with the location of the intermediate bleeder strip 50B (i.e., the vacuum ports are positioned adjacent each end of the intermediate bleeder strip), which extends across the mold 38 beneath the foam core 30. This positioning may enhance the ability of the vacuum to draw air through the intermediate bleeder strip 50B from the layers of fiberglass mat forming the roof 26E of the truck cap 10, and in particular the portion of the first layer of fiberglass mat 28A positioned beneath the foam core 30.

Figure 16:
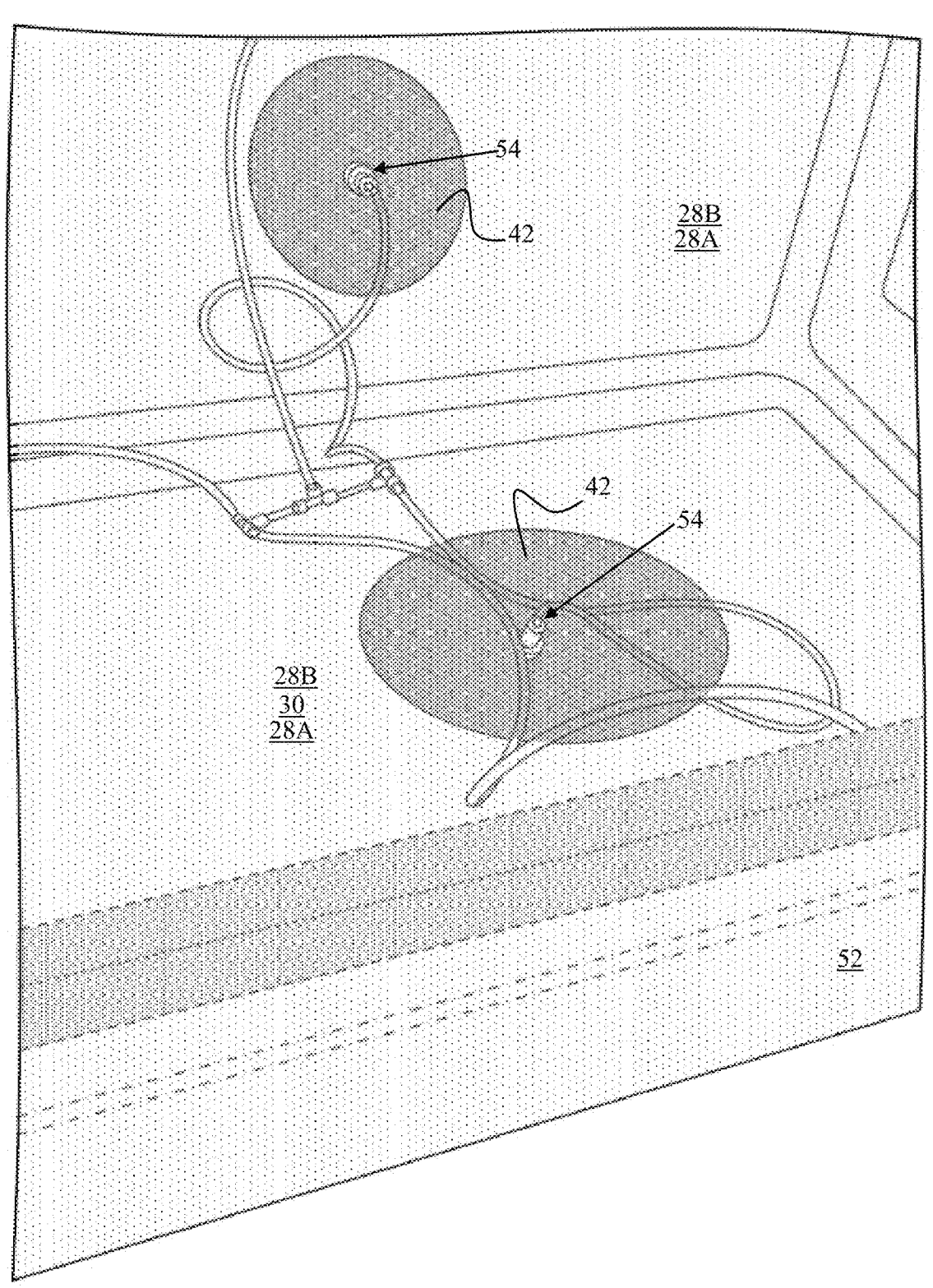
FIG. 16 is a perspective of resin being delivered into the mold cavity underneath the cover.

Referring to FIG. 16, the cover 52 includes four (broadly, "at least one") injection ports 54 that are placed in fluid communication with a source of resin via a tube attached to each injection port. FIG. 16 shows two of the four injection ports in communication with tubes leading to the resin source. The injection ports 54 are located to generally provide an even distribution of resin throughout the fiberglass mat layers 28A, 28B as the resin is injected. In the illustrated embodiment, the injection ports 54 are near the center of the front wall 38A of the mold, near the center of the left wall 38B of the mold, near the center of the right wall 38C of the mold, and near the center of the roof portion 38E of the mold. Other locations, or more or fewer injection ports, are not outside the scope of this disclosure.

The cover 52 may be formed by any suitable means. For example, the cover 52 may be formed by applying silicone over the mold 38 in a conventional manner. The silicone may be applied by spraying it over the mold. Prior to applying the silicone, a tape, such as Sworl branded tape, may be applied around the flange 44 of the mold 38 in the location where it is desired to form the vent channel 52B of the cover 52. The tape prevents the sprayed silicone from entering the area where it is desired to form the vent channel 52B. When the silicone solidifies, the cover 52 may be removed from the mold 38 for use.

With the cover 52 in position over the mold 38 and covering the layers of fiberglass mat 28A, 28B, and with the tubes joining the vacuum ports 52D, 52E to the vacuum and injection ports 54 to the resin supply, an industrial vacuum is actuated to draw air out of the fiberglass mats 28A, 28B between the cover 52 and mold 38. When the vacuum is actuated, air is drawn through the seal ports 48A, 48B defined by the bottom of the slot 46 of the mold. As the vacuum draws air through the seal ports 48A, 48B of the slot 46, the rib 52A of the cover is suctioned into the slot 46 of the mold, forming a closed seal, or sealing engagement between the rib 52A and surfaces of the mold 38 surrounding the slot 46. This sealing engagement prevents ambient air from entering the space between the cover 52 and mold 38 during the molding process.

The vacuum further draws air through the first and second vacuum ports 52D, 52E of the cover 52 to evacuate air from the fiberglass mat layers 28A, 28B between the cover 52 and mold 38. The air is drawn through the vacuum ports 52D, 52E, the vent channel 52B, and the bleeder strip 50A extending around the perimeter of the mold and the intermediate bleeder strip 50B extending across the roof 38E of the mold. Air within the fiberglass mat layers 28A, 28B travels through the bleeder strips 50A, 50B on its way toward the vacuum ports 52D, 52E. Because the vent channel 52B and bleeder strips 50A, 50B extend around the entire perimeter of the flange 44, and the intermediate bleeder strip 50B extends across the length of the mold 38, the vacuum is able to effectively evacuate almost all air from the closed system, i.e., the volume between the cover 52 and mold 38 interior of the rib/slot interface. The posts 52C of the cover within the vent channel 52B prevent the vent channel from collapsing as air is drawn through it, which keeps it open to permit air flow out of the vacuum ports 52D, 52E. In other words, the posts 52C provide necessary structural support which allows the continuous vent channel 52B to remain open placing the vacuum ports 52D, 52E in fluid communication with the bleeder strip 50A, 50B and fiberglass mat layers 28A, 28B. The configuration allows most, if not all, of the air within and between the fiberglass mats 28A, 28B and the foam core 30 to be evacuated from the closed cavity, thereby pressing the layers of fiberglass and foam core tightly together. A vacuum gauge is checked to make sure the gauge pressure in the mold remains steady within an inclusive range of about 25-50 bar, which indicates that most, if not all, of the air is evacuated and the seal is closed.

Figure 18:
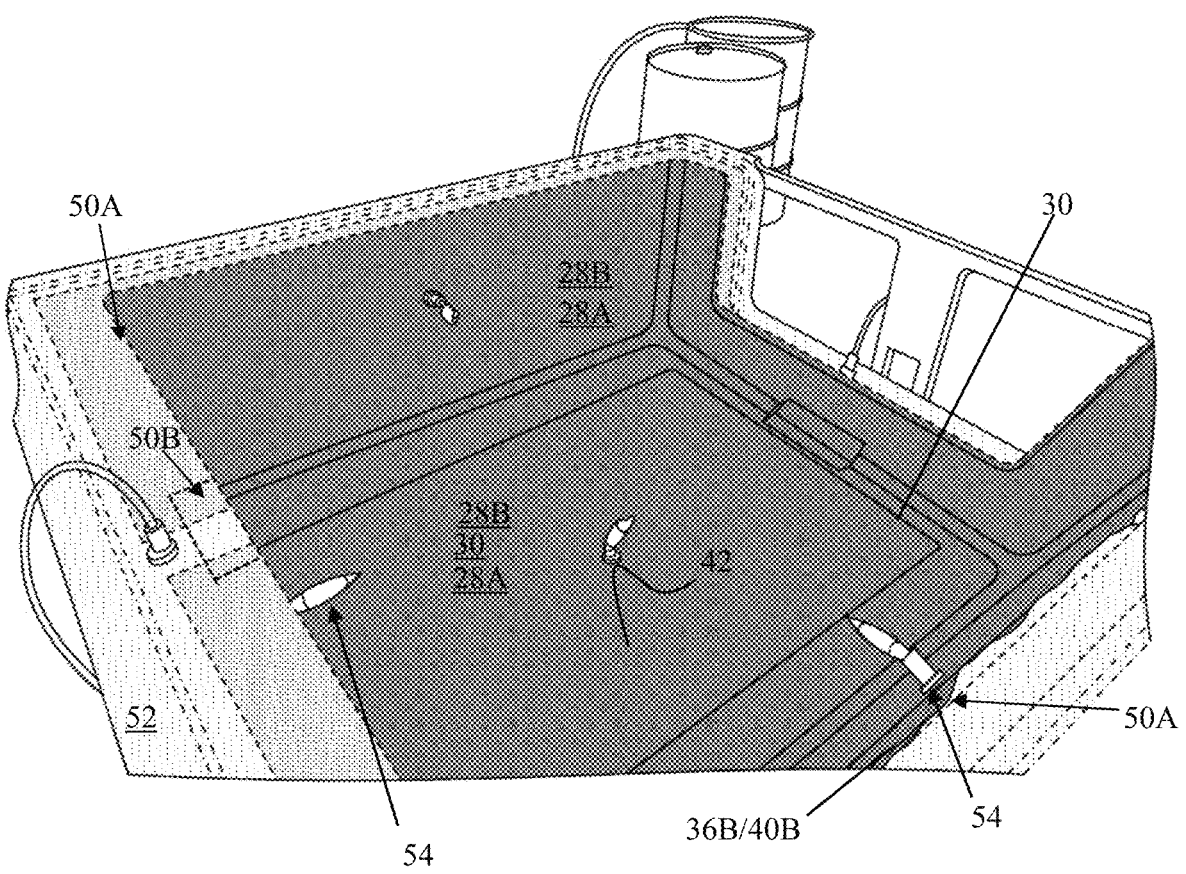
FIG. 18 is a perspective of the mold after the resin has saturated the fiberglass.

Once the gauge pressure holds at a steady level, a predetermined amount of resin 42 is injected into the closed cavity through the injection ports 54 to impregnate with resin the first and second layers 28A, 28B and the foam core 30, illustrated in FIG. 16. In the illustrated embodiment, the predetermined amount of resin is within the inclusive range of 28-30 pounds. The ratio of the weight of the fiberglass layers 28A, 28B and foam core 30 to resin may be between 50% fiberglass mat material and foam core to 50% resin; 55% fiberglass mat material and foam core to 45% resin; and desirably 60% fiberglass mat material and foam core to 40% resin. Referring to FIG. 18, the closed cavity is fully saturated with resin 42. At ambient conditions (about 72° F.), it takes about 20-30 minutes for the cavity to become fully saturated.

Figure 17:
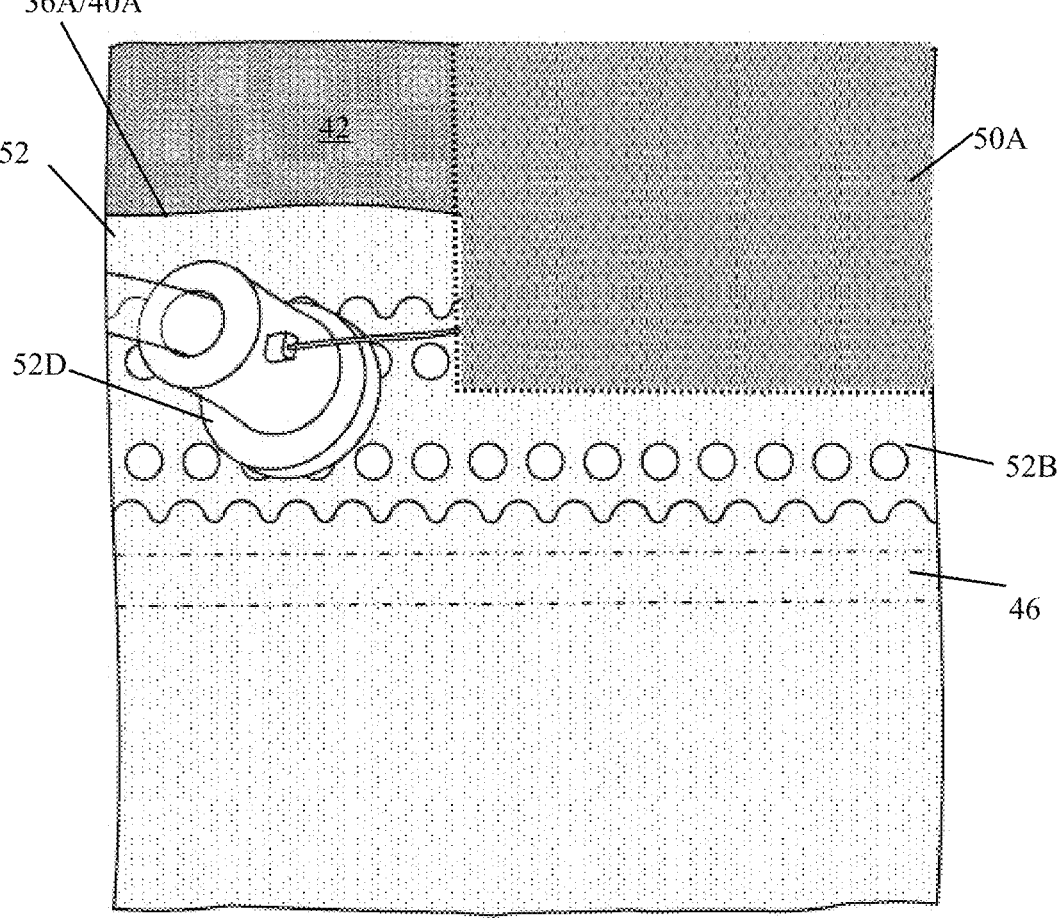
FIG. 17 is a close up view of the resin terminating at the bleeder strip.

FIGS. 17 and 18 illustrate the bleeder strip 50A inhibiting the resin 42 from flowing and past the peripheral edge of the fiberglass mat layers 36A/40A and into the vent channel 52B. As shown in FIG. 17, the bleeder strip 50A is shaded and marked by dash lines, whereas the resin 42 is shaded and marked by solid lines. In FIG. 18, the bleeder strip 50A inhibiting the resin 42 is best illustrated on the right side of the flange, indicated by uneven curves of the resin terminating at the edge of the mat layers 36B/40B. In this manner, the bleeder strip 50A stops the resin from flowing into the vent channel 52B of the cover 52 and into the vacuum ports 52D, 52E. This allows the vacuum to continuously operate while the resin 42 is injected without the resin blocking the vacuum ports 52D, 52E. The vacuum assists in drawing resin throughout the fiberglass layers 28A, 28B as it is injected. The placement of the vacuum ports 52D, 52E and injection ports 54 may be determined in a manner that facilitates even resin distribution throughout the fiberglass layers 28A, 28B. In particular, the intermediate bleeder strip 50B positioned beneath the foam core 30 facilitates resin being drawn from the injection ports 54 to the first layers of fiberglass mat 28A positioned beneath the foam core 30 at the center of the roof 38E of the mold 38, (FIG. 18). Extending the bleeder strip 50A around the perimeter of the flange 44 further facilitates even resin distribution by allowing the resin to be drawn through the fiberglass layers 28A, 28B from around the entire perimeter of the flange 44. Once fully saturated, the injection tubes are cinched off (FIG. 18), and the resin is allowed to cure. At ambient conditions, it takes about 45-60 minutes to allow the resin to cure. In the illustrated embodiment, the resin is cured when it reaches a temperature of about 85° F. Once cured, the cover 52 can be removed, as shown in FIGS. 21-23. When removed from the mold 38, the sidewall of the truck cap 10 (or front wall, rear wall, left wall, and right wall 26A-D) has a thickness of about 225 mils, and the roof 26E where the foam core 30 is located has a thickness of about 500-625 mils. The time in which the resin cures varies depending on ambient conditions. In general, it takes more time to cure in colder conditions and less time to cure in warmer conditions.

The base 12 is formed using a similar CCBM process. The process is carried out using two layers of fiberglass material and scaled down for the size of the base. In other words, because the surface area of the base is less than the surface area of the top 14, fewer vacuum ports and injection ports may be needed. Once the base 12 is cured and removed from its mold, it can be trimmed, as necessary to its desired shape, and secured to the top 14 as described below.

Referring to FIGS. 21-24, a pair of jigs 56 and clamps (not shown) are used to assist in holding and positioning the base 12 with respect to the top 14 while an epoxy 58 (broadly, "bonding agent") applied to the outer peripheral edge, or side edge, 16A of the base 12 and cures to bond the base 12 to the left wall 26C, right wall 26D, and front wall 26A of the top 14. Once the epoxy 58 has cured, the jigs 56 and clamps are removed and the cap 10 is formed more generally as a combination of the top 14 and base 12. In the illustrated embodiment, the first and second jigs 56 have substantially identical features. The first jig comprises a crossbar 56A that supports a pair of outer feet 60A, 60B and a pair of inner feet 62A, 62B. Referring to FIG. 22, the crossbar includes a first end portion 64, a second end portion 66 opposite the first end portion 64, and a length defined therebetween. The crossbar 56A defines a crossbar Z-axis CBZA. In the illustrated embodiment, the crossbar 56A is a square bar, although the crossbar may be any suitable shape of bar, tube, or support. The length of the crossbar 56A, e.g., about 7 feet, is sufficient to span the width of the mold. The first outer foot 60A comprises a sleeve 60C and an outer foot rest 60D attached to the sleeve. The sleeve 60C is configured to slide along the crossbar 56A which moves the outer foot rest 60D in a direction aligned with the crossbar Z-axis CBZA. As shown, the outer foot rest 60D is a piece of metal square tube, although it may be formed from any suitable material. The outer foot rest 60D is oriented to extend along an X-axis, which is perpendicular to the crossbar Z-axis CBZA. FIG. 22 shows the sleeve 60C and outer foot rest 60D welded together. Bolts (broadly, "fasteners" or "locks") secure the sleeve 60C to the crossbar 56A in a semi-permanent positon. Referring to FIG. 23, the outer foot rest 60D has a mold engagement surface 68 that engages the flange 44 of the mold 38 when the crossbar 56A is clamped to the flange 44.

Referring to FIG. 22, the inner foot 62A comprises a sleeve 62C, a collar 62D, an adjustable inner foot rest 62E, and a neck 62F slideable up and down the collar along a Y-axis. Like the sleeve of the outer foot 60A, the sleeve 62C of the inner foot 62A is configured to slide along the crossbar 56A in a direction aligned with the crossbar Z-axis CBZA. Bolts (broadly, "fasteners" or "locks") secure the sleeve 62C to the crossbar 56A in a semi-permanent positon. The collar 62D is welded to the sleeve 62C and oriented to extend along the Y-axis, perpendicular to the crossbar Z-axis CBZA. The collar 62D is a piece of square metal tube, although it may be formed from any suitable material. The inner foot rest 62E includes a neck 62F slidably received by the collar 62D to form a telescopic connection to the collar 62D. A bolt can be loosened to adjust the height of the first inner foot rest 62E relative to the mold engagement surface 68 of the outer foot rest 60D and tightened to lock the first inner foot rest 62E to the collar 62D.

Referring to FIG. 23, the mold engagement surfaces 68 of the outer feet 60A, 60B are supported by the flange 44. FIG. 23 shows a lower surface 70 of the inner foot 62A engaged with the mounting surface 16 of the base 12. The inner foot 62A is adjustable along the Y-axis to set a desired distance along the Y-axis between the lower surface 70 of the inner foot 62A and the mold engagement surfaces 68 of the outer feet 60A, 60B. For example, as shown in FIG. 23, the lower surface 70 of the inner foot rest 62E is spaced below the mold engagement surface 68 of the outer foot 60A along the Y-axis. This configuration spaces the mounting surface 16 of the base 12 above the lower edge 72 of the top 14 when the truck cap 10 is installed on a truck. The lower edge 72 of the top 14 of the truck cap 10 is at the same height in the mold 38 as the mold engagement surface 68 of the outer fee 60A, 60B. Spacing the lower edge 72 of the truck cap 10 from the mounting surface 16, allows a lower portion of the top of the truck cap, referred to above as the "lip" 20, to extend downward from the mounting surface 16 over the outer surface of the side walls of the truck bed when the truck cap 10 is installed on a truck. It is with the understanding the second jig comprises identical features as the first jig 56. Depending on the model of the truck for which the cap is being designed, the first and second jigs 56 can be adjusted as needed to allow for a desired distance from the mounting surface 16 of the base 12 to the lower edge 72 of the top 14 of the truck cap. Thus, the jigs 56 can be used to set the base 12 to the top 14 for many different types of trucks. Other devices for setting and securing the base 12 to the top 14 are not outside the scope of this disclosure.

Clamps (e.g. woodworking clamps or the like) are used to clamp the outer edge of the crossbar 56A to the flange 44 of the mold 38. Another clamp clamps the crossbar 56A to the base 12. The clamps hold the base 12 in place relative to the top 14 while epoxy applied to the outer peripheral edge 16A of the base 12 cures to bond the base 12 to the inner surface of the top 14. Once the epoxy cures, the jigs 56 are removed and the cap 10 can be removed from the mold 38. Excess portions of the fiberglass mat forming the base 12 and top 14 can then be trimmed away prior to sending the part to paint. Further, any desired openings can be cut in the side walls or front wall of the truck cap 10 for the installation of windows or storage compartments. A roof rack may also be installed on top of the truck cap 10, which may be used to carry items on top of the truck cap, such as a roof-top tent, a cargo container, sporting equipment, or other desired items.

In general, the truck cap 10 formed from the CCBM process may weigh about 80 pounds when manufactured for a Toyota Tacoma having a five foot long bed. Of course, for other types of trucks and bed sizes, the truck cap 10 may weight more or less than 80 pounds. To install the truck cap 10 on the truck, one or more people can simply lift the cap 10 so the mounting surface 16 of the base 12 aligns with the bed rail, or tops of the sidewalls and front wall of the cargo area of the truck, and the truck cap 10 can be lowered to place the cap on the truck. Clamps are then used to secure the base to the bed rails, which are shown in FIG. 24.

The specifications described herein of the truck cap 10 may vary during manufacture depending on the make and model of the truck for which the cap is designed.

The base 12 and top 14 of the embodiment described herein are formed separately. It is contemplated that the base and top, depending on their specific structure, may be formed simultaneously in a single mold.

FIGS. 25-31 show an alternative embodiment of truck cap 100 in accordance with the invention described herein. The truck cap 100 may be formed from a closed cavity bag molding process using the mold 38 similar to the process for making the truck cap 10 described above. The truck cap 100 is substantially similar to the truck cap 10 except for the manner in which the base 102 of the truck cap 100 is mounted to the top 104 of the truck cap 100, as described in more detail below.

Figure 25:
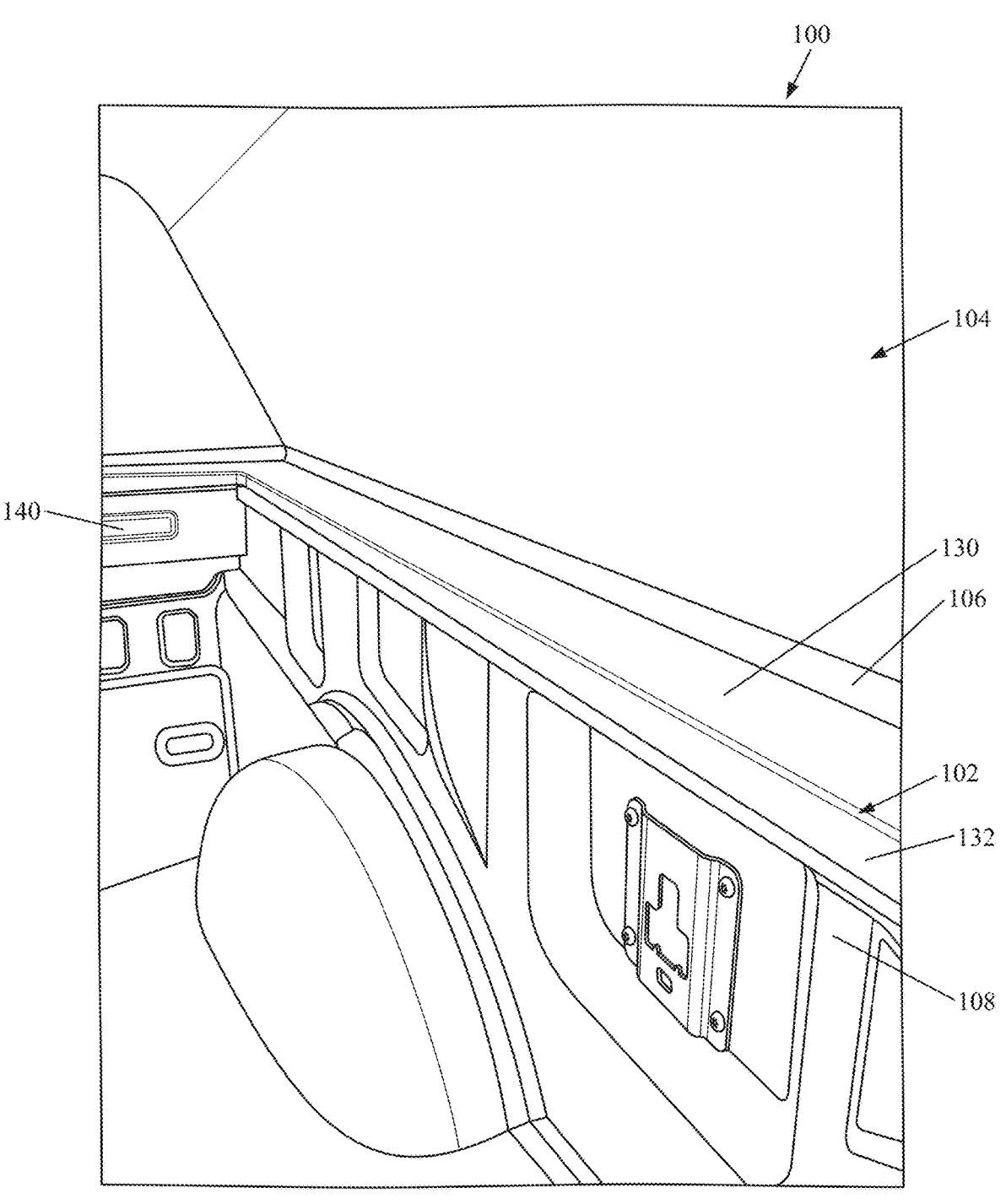
FIG. 25 is a view of the inside of a truck bed showing an alternative embodiment of truck cap positioned on the bed rails of the truck.
Figure 26:
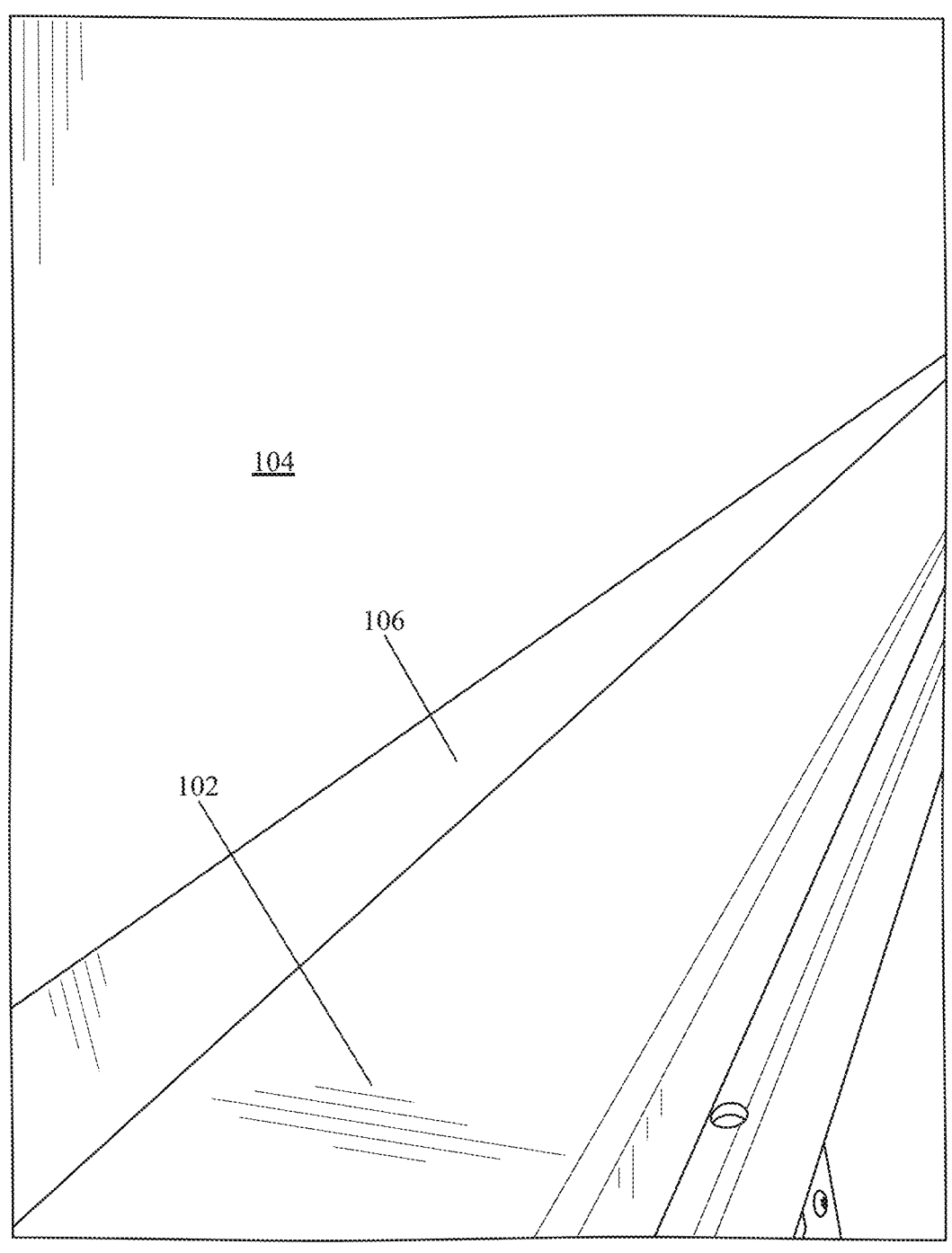
FIG. 26 is a close-up view showing the truck cap of FIG. 25 positioned on the bed rails of the truck.

The truck cap 100 includes a base 102, top 104 mounted to the base, and base supports 106, 110 (FIG. 27) that are integrated into the top 104. As shown in FIG. 25, the truck cap 100 is mountable to the sidewalls of a truck (one of which is identified as 108 in FIG. 25) for covering a cargo area of the truck in the same manner as described above for the truck cap 10.

Figure 27:
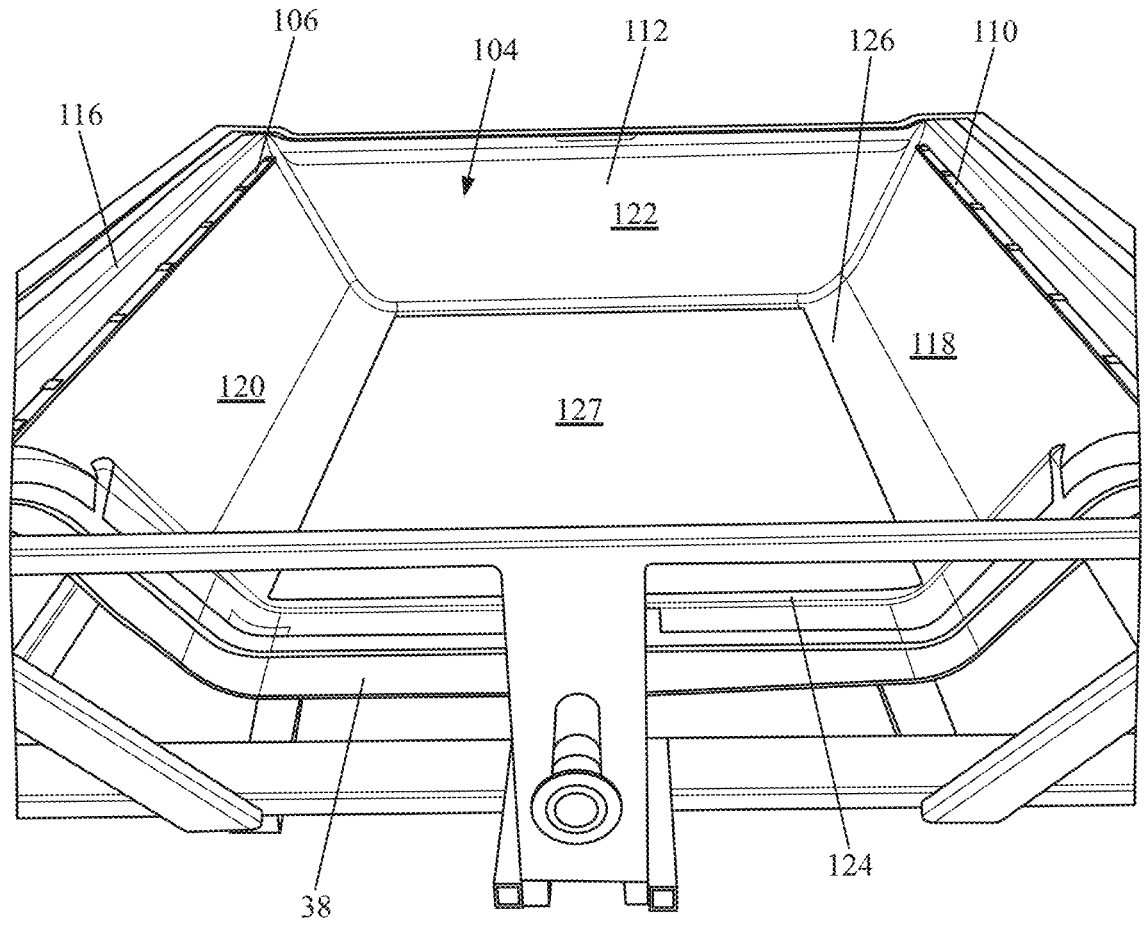
FIG. 27 is a perspective view showing a step in the process of forming the truck cap of FIG. 25 with a first layer of a top of the truck cap positioned in a mold and base supports joined to the first layer adjacent sidewalls of the mold.
Figure 28:
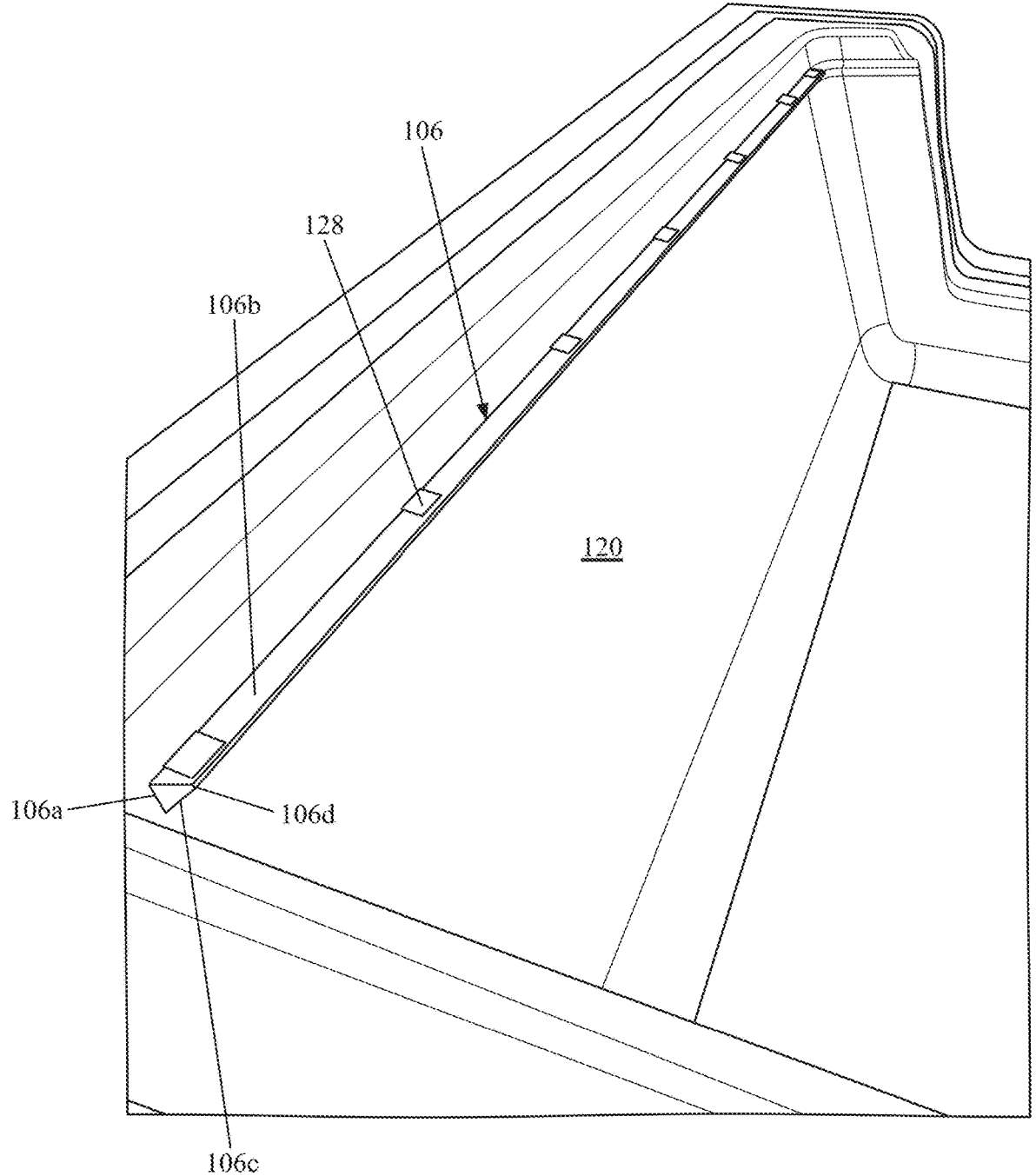
FIG. 28 is a perspective view showing one of the base supports joined to the first layer of the top of the truck cap.

As with the truck cap 10 described above, the truck cap 100 is formed from two separate molded components, the base 102 and the top 104, that are joined together. The top 104 is formed and structured in a similar manner as the top 14 described above, except that the top 104 includes the base supports 106 and 110. The top 104 includes first and second layers of fiber mat 112 (FIG. 27) and 114 (FIG. 29) that are impregnated with resin in the same manner as described above for truck cap 10. The base supports 106 and 110 are positioned between the first and second layers of fiber mat 112 and 114. The base supports 106 and 110 are each positioned near the lower edge 116 of the top 104, and they extend across the left and right walls 118 and 120 of the top 104 from adjacent a front wall 122 of the top 104 to adjacent a rear wall 124 of the top 104. The front 122, rear wall 124, left wall 118, and right wall 120 may broadly be referred to herein as a sidewall of the top 104, which extends downward from the roof 126. FIG. 27 also shows a reinforcement 127 positioned in the roof 126 in a similar manner as described above with respect to truck cap 10. The reinforcement 127 is positioned between the first and second layers of fiber mat 112 and 114.

The base supports 106 and 110 have substantially the same structure. Accordingly, only the base support 106 is described in detail herein with reference to FIG. 28. The base support 106 has a first surface 106a that abuts the first layer of fiber mat 112 and is parallel to the right wall 120 of the formed top 104. A second surface 106b of the base support 106 extends laterally away from the first surface 106a toward the left wall 118. The second surface 106b may be generally parallel with the roof 126. A third surface 106c extends from the upper edge of the first surface 106a toward the left wall 118. A fourth surface 106d connects the second and third surfaces 106b-d. The fourth surface 106d is relatively short such that the cross-section of the base support 106 is generally triangular. The base support 106 includes an elongate strip that includes the first, second, third, and fourth surfaces 106a-d. The elongate strip may be made from foam. The first surface 106a of the base support 106 is mounted to the first layer of fiber mat 112. For example, the base support 106 may be adhered to the first layer of fiber mat 112. The base support 106 further includes a plurality of mounting plates, one of which is identified as 128. The mounting plates 128 are coupled to the second surface 106b and are spaced apart from each other across the second surface 106b. The mounting plates 128 may be bonded to the second surface 106b with an adhesive. The mounting plates 128 may be made from metal, such as aluminum.

Figure 29:
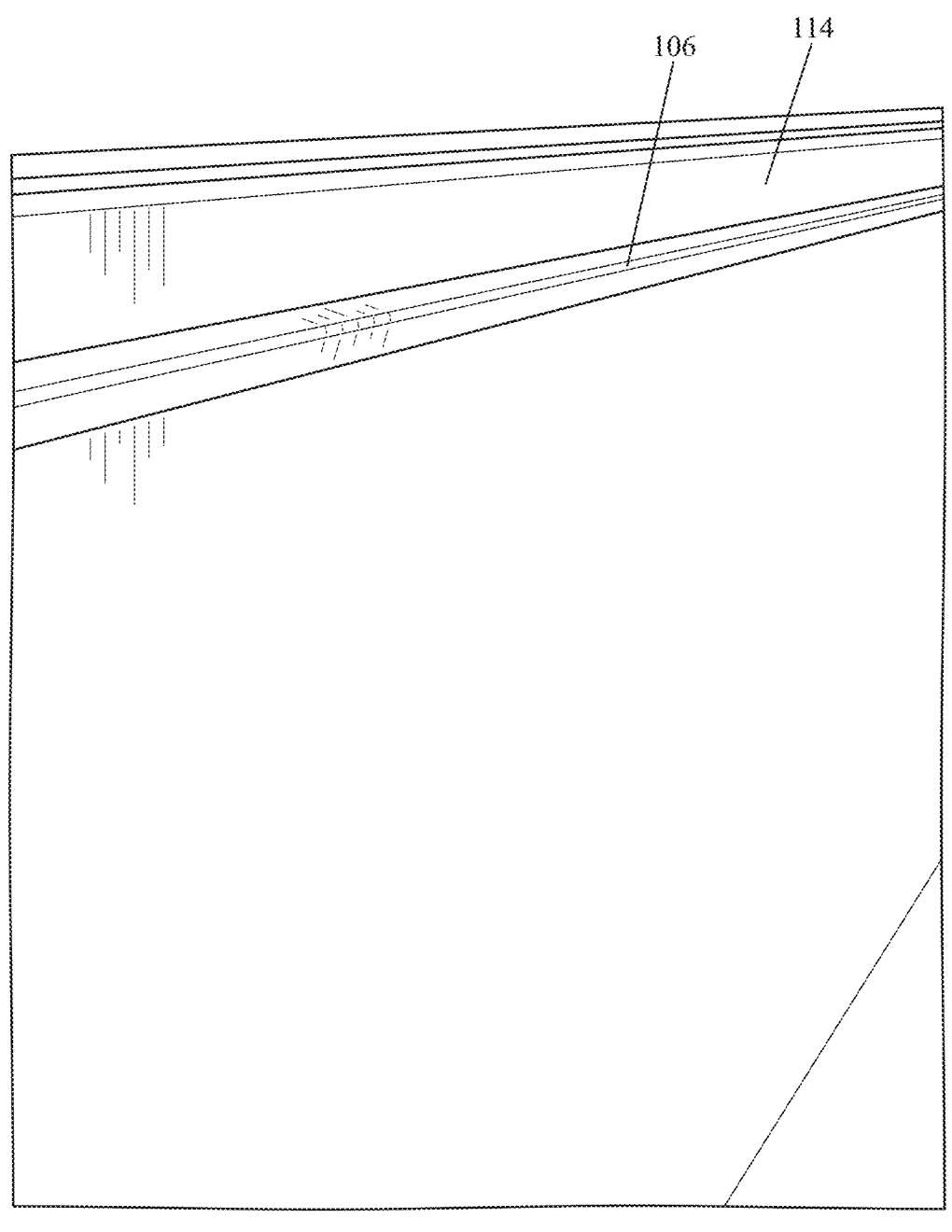
FIG. 29 is a perspective view showing a second layer of the top of the truck cap positioned over the first layer and base support.

FIG. 29 shows the second layer of fiber mat 114 positioned over the base support 106 and first layer of fiber mat 112. After the second layer of fiber mat 114 is positioned over the base support 106, resin is injected into the first and second layers of fiber mat 112 and 114 in the same manner as described above for truck cap 10. Once the resin cures, the base support 106 is securely fixed in place within the top 104.

Figure 30:
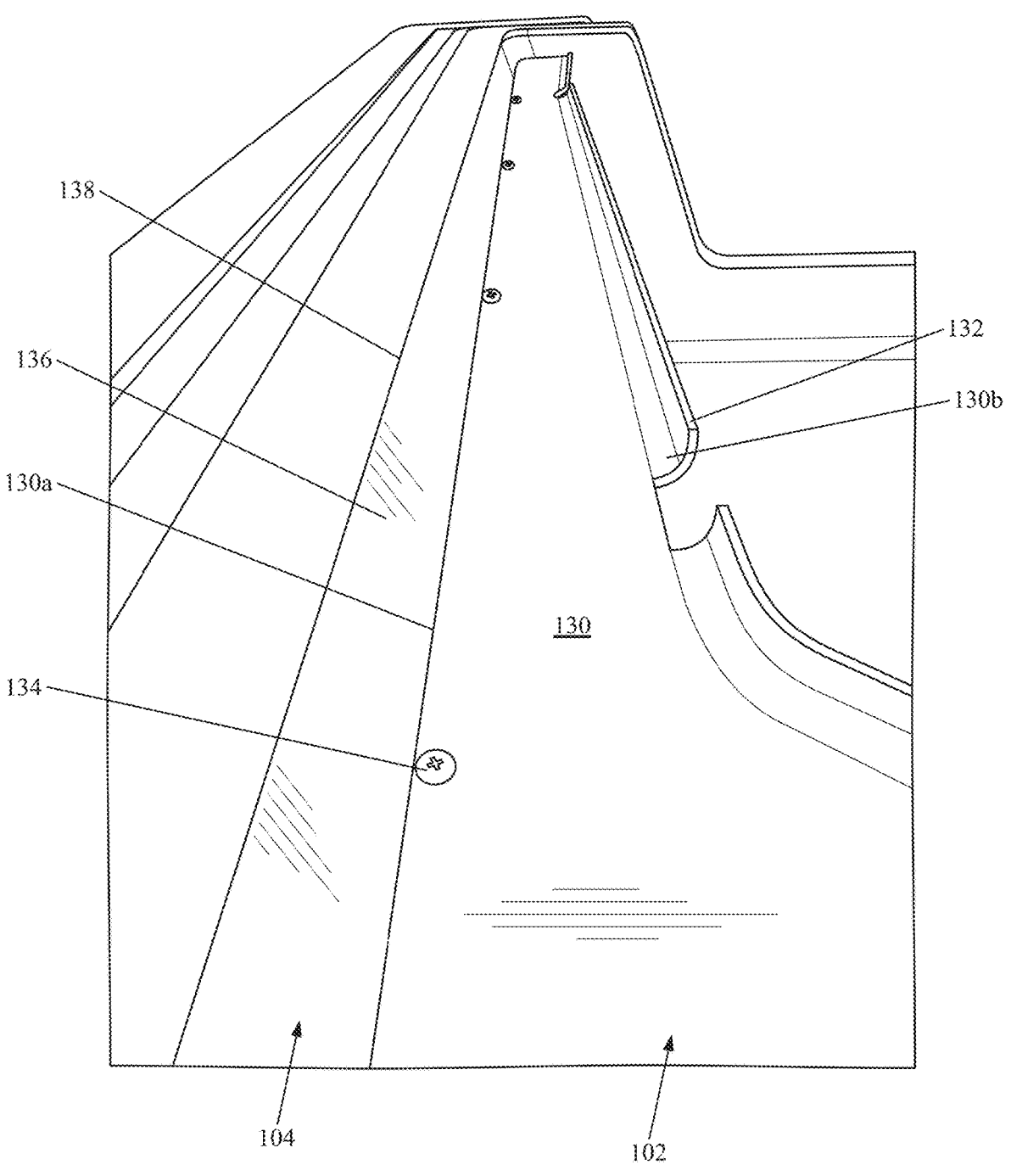
FIG. 30 is a perspective view showing a base mounted to the base support.

Referring to FIG. 30, the base 102 is shown in more detail mounted to the top 104. The base 102 is formed and structured in a similar manner as the base 12 described above, i.e., the base 102 is formed from at least one layer of fiber mat impregnated with resin. The base 102 may be formed using a closed cavity bag molding process as described above. The composite base 102 includes a mounting surface 130 with an outer peripheral edge 130a and an inner peripheral edge 130b. An inner edge portion 132 of the base 102 extends downward from the inner peripheral edge 130b when the truck cap 10 is mounted on a truck, as described in more detail below. After the base 102 and top 104 are formed, the base 102 is positioned so that the mounting surface 130 is on top of and supported by the second surface 106b (FIG. 28) of the base support 106. Fasteners, one of which is identified as 134 in FIG. 30, mount the base 102 to the base support 106. The fasteners 134 may be screws that engage the mounting plates 128 (FIG. 28) of the base support 106. The base 102 may further be bonded to the base support 106 with an adhesive. When the base 102 is mounted to the top 104, the outer peripheral edge 130a of the mounting surface 130 is positioned adjacent an inner surface 136 of the top 104 and below a lower edge 138 of the top 104.

When the cap 100 is installed over the cargo area of a truck bed as shown in FIG. 25, the mounting surface 130 of the base 102 is positioned on top of the bed rail, or tops of the sidewalls 108 and front wall 140, of the cargo area of the truck. The inner edge portion 132 of the base 102 extends downward along the inner side of the sidewalls 108, and a lower portion of the top 104 extends downward from the base 102 in a similar manner as described above with respect to cap 10. The base 102 is clamped to the bed rails of the truck in a similar manner as described above with respect to cap 10.

Figure 31:
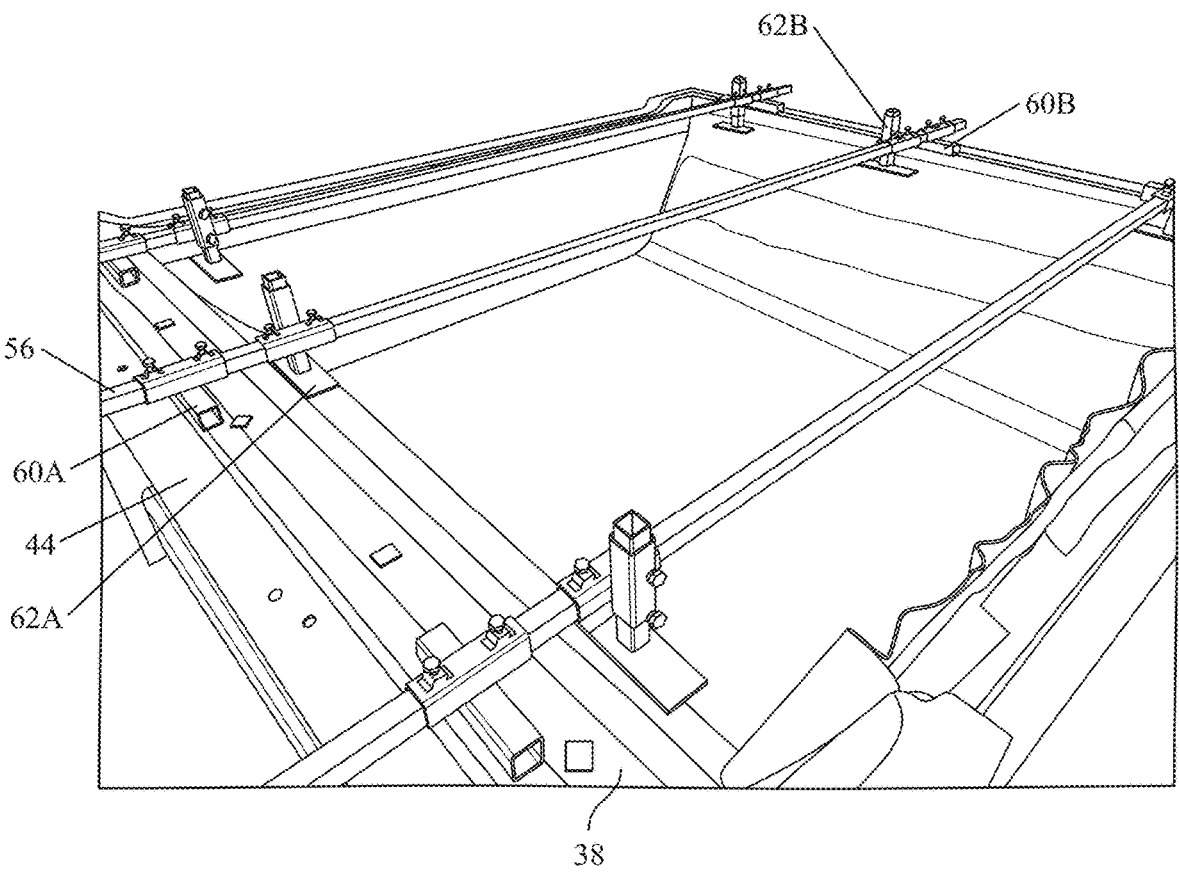
FIG. 31 is a perspective view showing jigs that may be used to position the base support for mounting it to the top of the truck cap.

FIG. 31 shows three of the jigs 56 (described above) positioned for use to secure the base support 106 to the top 104. The outer feet 60A, 60B of the jigs 56 are supported by the flange 44 of the mold 38. The inner feet 62A, 62B are adjusted to a desired height for attachment of the base support 106 to the top 104. For example, the inner feet 62A, 62B may be adjusted to a desired height based on the model of truck for which the cap 100 is designed, in a similar manner as described above with respect to use of the jigs 56 for the cap 10. The second surface 106b (FIG. 28) of the base support 106 is positioned to abut the lower surface of the inner foot 62A, while the base support 106 is bonded to the top 104. The base support 110 (FIG. 27) is positioned to abut the lower surface of the inner foot 62B, and the base support 110 is bonded to the top 104.

Except for the differences noted above with respect to use of the base support 106, the truck cap 100 may be made with the mold 38 in accordance with the process set forth above for making the truck cap 10.

From the foregoing it will be shown that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed is:

1. A truck cap for covering a cargo area of a truck, the cargo area being defined in part by sidewalls of the truck, the truck cap comprising:
  a composite top comprising a first layer of fiber mat and a second layer of fiber mat, the first and second layers being impregnated with a top resin, the composite top comprising a sidewall and a roof extending from the sidewall;
  a base support positioned in the sidewall between at least a portion of the first and second layers; and
  a composite base coupled to the base support, the composite base comprising a base fiber mat impregnated with a base resin, and the composite base configured for mounting to sidewalls of a truck.

2. The truck cap of claim 1, wherein the base support comprises a first surface that is generally parallel to the sidewall of the composite top and a second surface that extends laterally away from the first surface.

3. The truck cap of claim 2, wherein the composite base comprises a mounting surface mounted to the second surface of the base support.

4. The truck cap of claim 3, wherein the mounting surface of the base is joined to the second surface of the base support with at least one fastener.

5. The truck cap of claim 4, wherein the base support comprises an elongate strip of foam and at least one mounting plate coupled to the foam, wherein the at least one fastener engages the mounting plate.

6. The truck cap of claim 3, wherein the mounting surface includes an outer peripheral edge adjacent an inner surface of the top, an inner peripheral edge opposite the outer peripheral edge, the inner peripheral edge includes an inner edge portion extending downward from the inner peripheral edge, the inner edge portion extends below a top of the sidewalls and front wall of the truck bed when the base is mounted to the truck.

7. The truck cap of claim 1, wherein a lower portion of the top extends downward from the base when the base is mounted to the sidewalls of the truck.

8. The truck cap of claim 1, further comprising a reinforcement positioned in the roof between at least a portion of the first and second layers.

9. The truck cap of claim 1, wherein the top and the base are formed using a closed cavity bag molding process.

10. A closed cavity bag molding process for manufacturing a truck cap, the process comprising:
  providing a female mold shaped to form a top of a truck cap, the female mold having a roof portion, and a sidewall extending upward from the roof portion;
  placing a first layer of fiber mat in the mold so that the first layer substantially covers the roof portion and the sidewall;
  mounting at least one base support to the first layer adjacent the sidewall;
  placing a second layer of fiber mat over the first layer and the base support;
  laying a flexible cover over the second layer, the flexible cover having an injection port and at least one vacuum port;
  actuating a vacuum that is in fluid connection with the at least one vacuum port so that the vacuum draws air out of the first and second layers; and
  delivering resin to the first and second layers through the at least one injection port, the resin impregnating the first and second layers as the vacuum draws air through the at least one vacuum port.

11. The method of claim 10, further comprising forming a base of a truck cap using a closed cavity bag molding process, the base comprising at least one layer of fiber mat impregnated with resin.

12. The method of claim 11, further comprising removing the flexible cover from the mold once the resin delivered through the injection port has at least partially cured to form a top of a truck cap in the female mold.

13. The method of claim 12, further comprising inserting the base into the female mold between first and second sides of the molded top so that the base is supported by the base support.

14. The method of claim 13, further comprising bonding the base to the base support.

15. The method of claim 13, further comprising joining the base to the base support with fasteners.

16. The method of claim 10, further comprising placing a reinforcement on top of at least a portion of the first layer so that the reinforcement is positioned over at least a portion of the roof portion of the mold.

* * * * *